US008098962B2

(12) United States Patent
Takeshima et al.

(10) Patent No.: US 8,098,962 B2
(45) Date of Patent: Jan. 17, 2012

(54) SIGNAL PROCESSING METHOD, APPARATUS, AND PROGRAM

(75) Inventors: Hidenori Takeshima, Ebina (JP); Toshimitsu Kaneko, Kawasaki (JP); Takashi Ida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 755 days.

(21) Appl. No.: 12/234,111

(22) Filed: Sep. 19, 2008

(65) Prior Publication Data

US 2009/0129703 A1 May 21, 2009

(30) Foreign Application Priority Data

Nov. 20, 2007 (JP) ................................. 2007-300783

(51) Int. Cl.
*G06K 9/40* (2006.01)
(52) U.S. Cl. ......... 382/299; 382/274; 382/275; 382/278
(58) Field of Classification Search .................. 382/274, 382/275, 278, 284
See application file for complete search history.

(56) References Cited

U.S. PATENT DOCUMENTS

| 6,754,442 | B1 * | 6/2004 | Nagai et al. ................... 386/222 |
| 7,027,054 | B1 * | 4/2006 | Cheiky et al. ................. 345/473 |
| 7,124,041 | B1 * | 10/2006 | Johnson et al. ................. 702/58 |
| 7,174,092 | B2 * | 2/2007 | Nagai et al. ................... 386/241 |
| 7,358,502 | B1 * | 4/2008 | Appleby et al. ......... 250/370.14 |
| 2007/0269137 | A1 | 11/2007 | Ida et al. |
| 2008/0107356 | A1 | 5/2008 | Matsumoto et al. |

OTHER PUBLICATIONS

U.S. Appl. No. 12/397,747, filed Mar. 4, 2009, Matsumoto, et al.
U.S. Appl. No. 12/408,918, filed Mar. 23, 2009, Takeshima, et al.
Nimish R. Shah, et al., "Resolution Enhancement of Color Video Sequences", IEEE Transactions on Image Processing, vol. 8, No. 6, Jun. 1999, pp. 879-885.
Sung Cheol Park, et al., "Super-Resolution Image Reconstruction: A technical Overview", IEEE Signal Processing Magazine, May 2003, pp. 21-36.
Brian C. Tom, et al., "Resolution Enhancement of Monochrome and Color Video Using Motion Compensation", IEEE Transactions on Image Processing, vol. 10, No. 2., Feb. 2001, pp. 278-287.
Masao Shimizu, et al., "Precise Sub-Pixel Estimation on Area-Based Matching", Proc, IEEE International Conference on Computer Vision, 2001, pp. 90-97.
Chris Harris, et al., "A Combined Corner and Edge Detector", Alvey Vision Conference, 1988, pp. 147-151.

(Continued)

*Primary Examiner* — Yosef Kassa
(74) *Attorney, Agent, or Firm* — Oblon, Spivak, McClelland, Maier & Neustadt, L.L.P.

(57) ABSTRACT

A method includes inputting to-be-processed data including a set of first-N-dimensional-coordinate values in an N-dimensional space and first-sampling values, inputting search-pattern data including a set of second-N-dimensional-coordinate values in the N-dimensional space and second-sampling values, setting a set of virtual-corresponding points designated by third-N-dimensional-coordinate values, acquiring input patterns each including third-sampling values within a first range with reference to a corresponding virtual-corresponding point, acquiring search patterns each including fourth-sampling-values within a second range with reference to a corresponding second-N-dimensional-coordinate value of the second-N-dimensional-coordinate values in correspondence with each of the second-N-dimensional-coordinate values, detecting, from the search pattern data, an estimated pattern including one search pattern and having smaller differences with respect to the input patterns than other search patterns, setting sampling values at first positions corresponding to the virtual-corresponding points in the estimated pattern as sampling values at the virtual-corresponding points, and converting a sampling rate of the to-be-processed data.

15 Claims, 16 Drawing Sheets

OTHER PUBLICATIONS

Jo Yew Tham, et al. "A Novel Unrestricted Center-Biased Diamond Search Algorithm for Block Motion Estimation", IEEE Transactions on Circuits and Systems for Video Technology, vol. 8, No. 4, Aug. 1998, pp. 369-377.

Masao Shimizu, et al., "Two-Dimensional Simultaneous Sub-pixel Estimation for Area-based matching", IEICE transations D-II, vol. J87-D-II, No. 2, 2004, pp. 554-564.

* cited by examiner

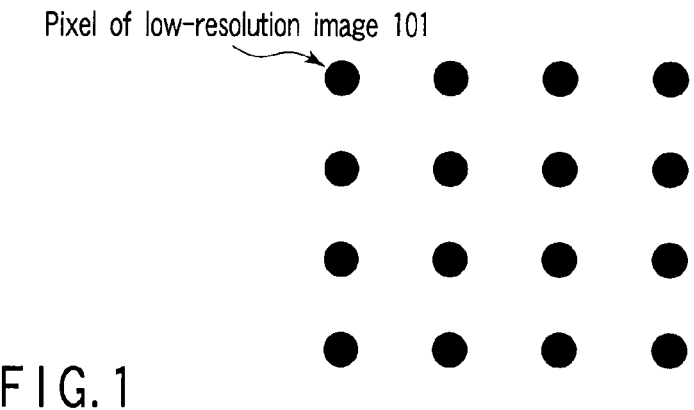
F I G. 1
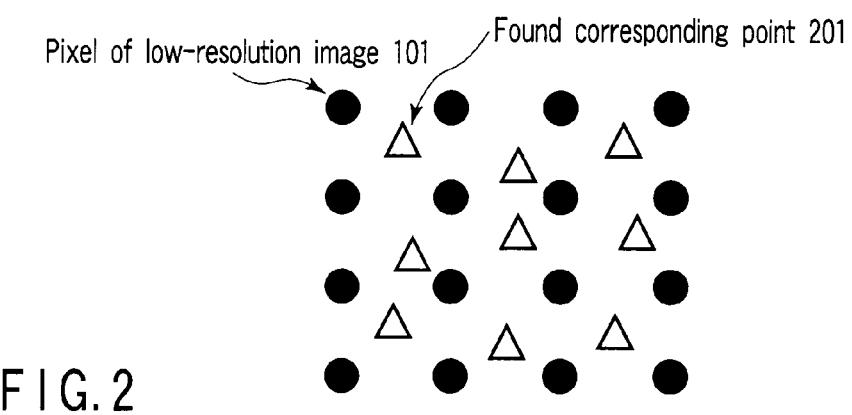
F I G. 2
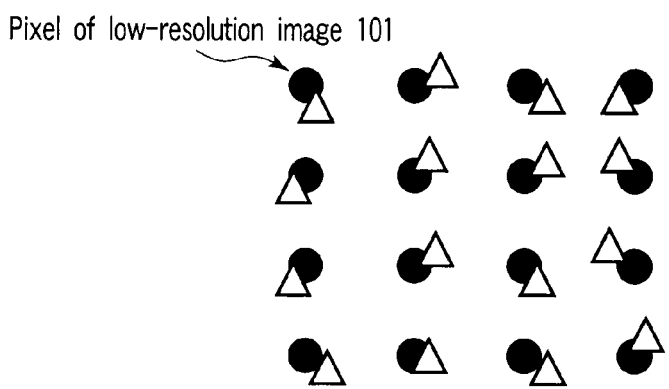
F I G. 3

Added equations using corresponding positions of other frames

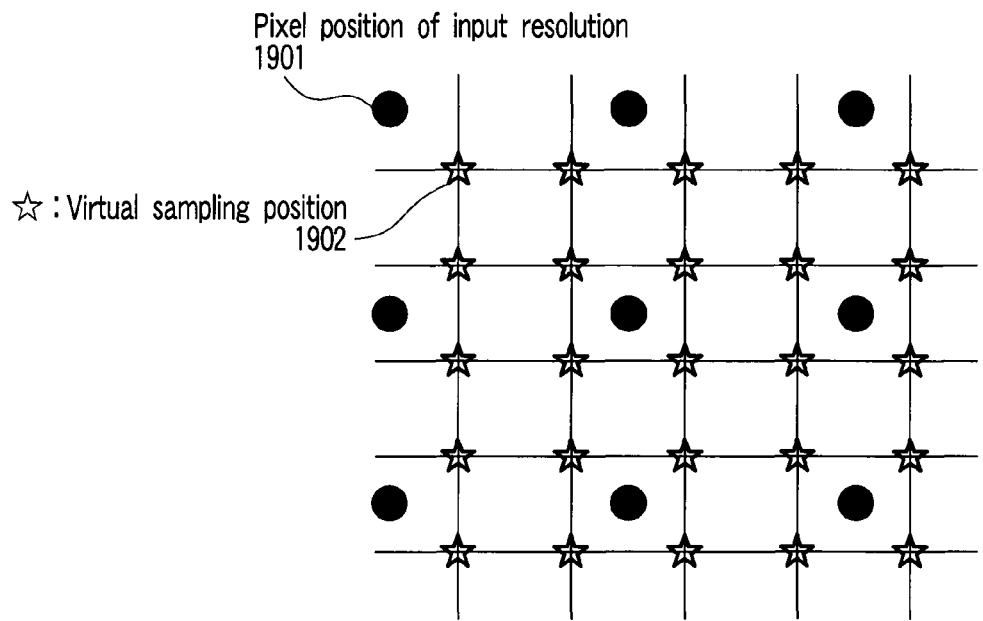
F I G. 19
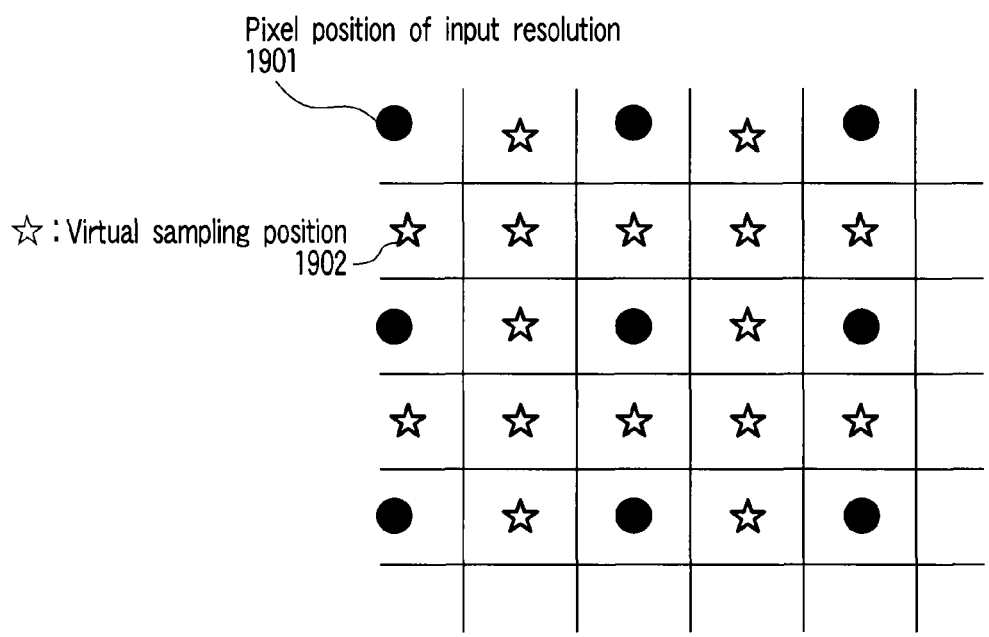
F I G. 20

☆ : Virtual sampling position   ● : Pixel position (center of pixel region)

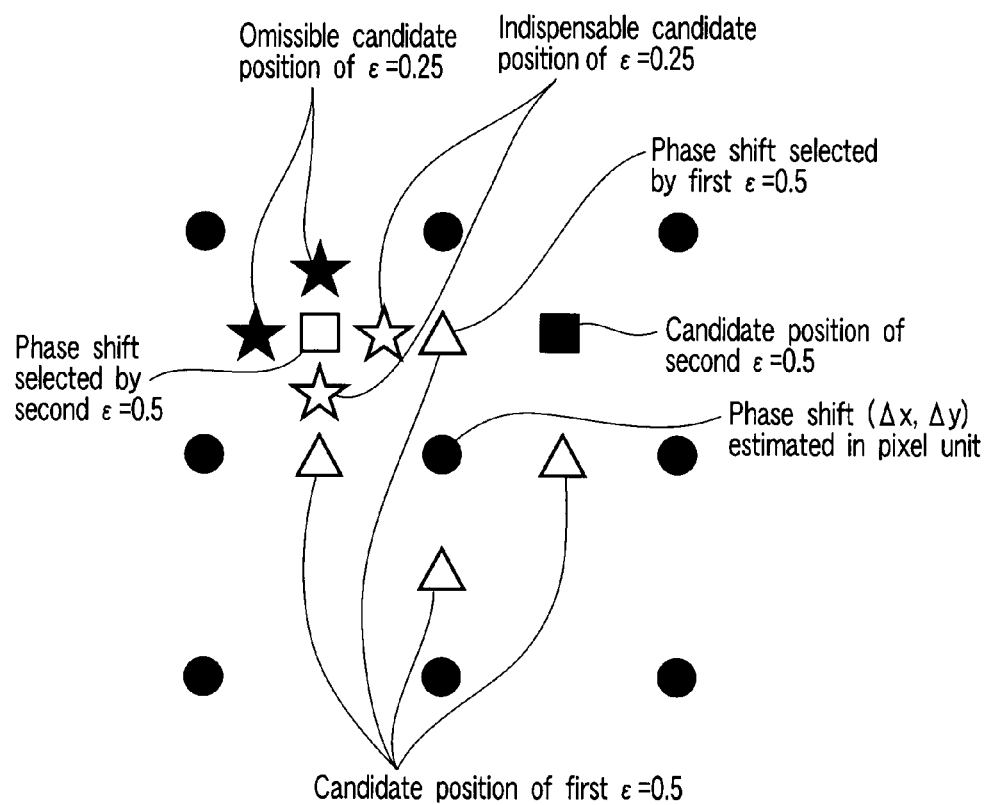
F I G. 32

SIGNAL PROCESSING METHOD, APPARATUS, AND PROGRAM

CROSS-REFERENCE TO RELATED APPLICATIONS

This application is based upon and claims the benefit of priority from prior Japanese Patent Application No. 2007-300783, filed Nov. 20, 2007, the entire contents of which are incorporated herein by reference.

BACKGROUND OF THE INVENTION

1. Field of the Invention

The invention relates to a signal processing method, apparatus, and program, which convert an N-dimensional input signal into an N-dimensional output signal of another sampling rate.

2. Description of the Related Art

Televisions and displays having high resolutions have prevailed. Upon displaying an image, a television or display converts the number of pixels of image data into that of a panel. Especially, in magnification that increases the number of pixels, as a method that can obtain an image sharper than linear interpolation, a method of reconstructing a high-resolution image using a plurality of pieces of frame information in consideration of inverse conversion of an image capturing process (deterioration process) is known (to be referred to as a reconstruction method hereinafter).

More specifically, for example, a block of several pixels squared (e.g., a block of 5 pixels in the horizontal direction×5 pixels in the vertical direction) is extracted from a low-resolution image to have a certain pixel as a center, and an area which has the same size as this block and includes pixels having pixel values close to those in the extracted block is searched in a frame to be converted. This search is conducted on the subpixel precision (for example, see M. Shimizu et al., "Precise Sub-pixel Estimation on Area-based Matching," in Proc. IEEE International Conference on Computer Vision, pp. 90-97, 2001). After the search, the center of the found corresponding block is defined as a corresponding point. In this way, a point A corresponding to another frame and a point B corresponding to the frame to be converted are associated with each other as an identical position of an identical object. This associating algorithm will be referred to as a block matching method hereinafter. This association is expressed by a motion vector having the point A as a start point and the point B as an end point. Since the search is conducted on the subpixel precision, the start point of the motion vector is the position of a pixel, but the end point is generally a position where no pixel exists. Such a motion vector is calculated for all pixels of the low-resolution image, and motion vectors to the frame to be converted, which vectors have respective pixels as start points, are similarly detected from another low-resolution image. After the motion vectors to the frame to be converted are obtained, the pixel values of the start points are allocated at the end points of the respective motion vectors as sampling values of the frame to be converted. Finally, sampling values of pixels of a high-resolution image, which are uniformly allocated in a grid pattern, are calculated from sampling points which are non-uniformly allocated and sampling values at these points. Many methods of such conversion (reconstruction) have been proposed. For example, a non-uniform interpolation method, POCS (Projection Onto Convex Sets), an ML (maximum likelihood) estimator, and a MAP (maximum a posteriori) estimator are known (for example, see S. C. Park et al., "Super-Resolution Image Reconstruction: A Technical Overview," IEEE Signal Processing Magazine, pp. 21-36, May 2003).

The method described as the related art searches for the position of a corresponding point for each pixel of another frame. Since no control is applied to a position found as a corresponding point, useless corresponding points are often found. Therefore, in order to find useful corresponding points, a method of using 10 to 30 other frames to double the vertical and horizontal resolutions needs to be used. Hence, the number of other frames needs to be increased to increase the chance of finding useful corresponding points.

Even when the number of frames is increased, no corresponding point often exists at an intermediate position with respect to a given low-resolution pixel. As a result, the estimation precision of a high-resolution image cannot be improved.

BRIEF SUMMARY OF THE INVENTION

In accordance with an aspect of the invention, there is provided a signal processing method comprising: inputting to-be-processed data including a set of first N dimensional coordinate values (N: a natural number) in an N dimensional space and first sampling values at the first N dimensional coordinate values; inputting search pattern data including a set of second N dimensional coordinate values in the N dimensional space and second sampling values at the second N dimensional coordinate values; setting a set of virtual corresponding points designated by third N dimensional coordinate values in the to-be-processed data; acquiring, from the to-be-processed data, a plurality of input patterns each including third sampling values within a first range with reference to a corresponding virtual corresponding point of the virtual corresponding points in the N dimensional space in correspondence with each of the virtual corresponding points, the third sampling values being included in the first sampling values; acquiring, from the search pattern data, a plurality of search patterns each including fourth sampling values within a second range with reference to a corresponding second N dimensional coordinate value of the second N dimensional coordinate values in correspondence with each of the second N dimensional coordinate values; detecting, from the search pattern data, an estimated pattern including one search pattern included in the search patterns and having smaller differences with respect to the input patterns than other search patterns included in the search patterns; setting a plurality of sampling values at first positions corresponding to the virtual corresponding points in the estimated pattern as set sampling values at the virtual corresponding points; and converting a sampling rate of the to-be-processed data using the set sampling values and the N dimensional coordinate values of the virtual corresponding points.

BRIEF DESCRIPTION OF THE SEVERAL VIEWS OF THE DRAWING

FIG. 1 is an exemplary view showing the pixel positions of a low-resolution image as an input image;

FIG. 2 is an exemplary view of corresponding points which greatly contribute to improvement of precision of an output image;

FIG. 3 is an exemplary view of corresponding points which do not so contribute to improvement of precision of an output image;

FIG. 19 is an exemplary view showing the settings of virtual sampling positions in step S1803 in FIG. 18;

FIG. 20 is an exemplary view showing the settings of virtual sampling positions in step S1803 in FIG. 18;

FIG. 32 is an exemplary view for explaining a method of using block errors for five points, which method allows to obtain a more precise evaluation result than the method explained using FIG. 25.

DETAILED DESCRIPTION OF THE INVENTION

Figure 4:
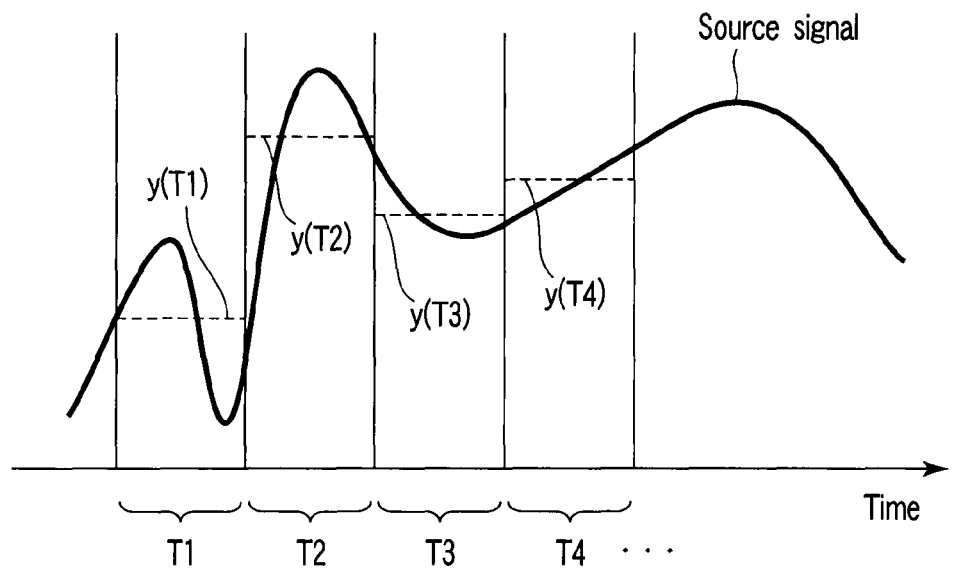
FIG. 4 is an exemplary view showing the sampling process of a one-dimensional signal.

A signal processing method, apparatus, and program according to embodiments of the invention will be described in detail hereinafter with reference to the accompanying drawings. Note that components denoted by the same reference numbers in the following embodiments execute the same operations, and a repetitive description thereof will be avoided.

A fundamental technique will be explained first.

In magnification that increases the number of pixels, as a method that can obtain an image shaper than linear interpolation, a reconstruction method of reconstructing a high-resolution image using a plurality of pieces of frame information in consideration of an image capturing process (deterioration process) pays attention to the fact that an object which appears in a frame to be converted also appears in other frames. This method detects the motion of the object at a precision (subpixel precision) higher than a pixel interval so as to obtain a plurality of sampling values having small positional deviations from local areas of the object, and attains resolution enhancement by combining these pieces of information.

The reconstruction method will be described in detail below. With this method, when low-resolution frames are time-serially input, they are sequentially converted into high-resolution frames. For example, three time-serial frames of a movie obtained by capturing a moving automobile are used as low-resolution images, and resolution enhancement is attained using one of these three frames as a reference frame. For example, the vertical and horizontal resolutions of this frame are doubled to obtain a high-resolution frame. When only one frame is used, the number of pixels of the low-resolution image, i.e., the number of sampling points with given sampling values is small with respect to unknown pixels of a high-resolution image. Even in this state, the pixel values of the high-resolution image can be estimated. However, if the number of sampling points with given sampling values can be increased, a high-resolution image can be obtained more precisely. For this purpose, the reconstruction method detects which positions in the frame to be converted an object that appears at respective pixel positions in low-resolution images other than the frame to be converted appears, and uses their pixel values as sampling values at the corresponding sampling points in the frame to be converted.

More specifically, for example, a block of several pixels squared (e.g., a block of 5 pixels in the horizontal direction×5 pixels in the vertical direction) is extracted from a low-resolution image to have a certain pixel as a center, and an area which has the same size as this block and includes pixels having pixel values close to those in the extracted block is searched in a frame to be converted. This search is conducted on the subpixel precision.

The object of the embodiments is to attain sampling rate conversion at higher precision than the related art, and the embodiments are not particularly limited to a two-dimensional image, but a technique popularly known as a related art is sampling rate conversion for a two-dimensional image. Hence, a case of a two-dimensional image will be exemplified below.

Since a low-resolution image of a frame to be converted is given, given intensity value of low-resolution pixels 101 shown in FIG. 1 can be used. The super-resolution technique estimates a high-resolution image with a higher precision by finding corresponding points other than the low-resolution pixels 101 from other frames in addition to the low-resolution pixels 101. According to experiments of the inventor, the positional relationship between the low-resolution pixels 101 and found corresponding points is not arbitrary, but the resolution enhancement precision largely depends on the allocations of the corresponding points. As shown in FIG. 2, corresponding points 201 which are found at intermediate positions with respect to the given low-resolution pixels greatly contribute to improvement of estimation precision of a high-resolution image. However, even when corresponding points 301, which are found at nearly the same positions as the given low-resolution pixels, as shown in FIG. 3, are used in estimation of a high-resolution image, the estimation precision of the high-resolution image cannot be so improved. That is, how the corresponding points shown in FIG. 3 are found, they merely increase the calculation volume and are often useless.

To solve this problem, the embodiments execute super-resolution processing in the following sequence. In the frame to be converted, the positions of ideal corresponding points upon execution of resolution enhancement are given as virtual corresponding points. The virtual corresponding points are often set at non-integer pixel positions (subpixel positions) on the frame to be converted. Next, integer pixel positions corresponding to the virtual corresponding points are searched from other frames (or from a database that stores a large number of frames). The reason why the search confined to the integer pixel positions is conducted is that the super-resolution processing needs precise intensity values of the corresponding points, and the corresponding points need to be associated with the integer pixel positions, the precise intensity values of which are given, so as to obtain the precise intensity values. The intensity values corresponding to the virtual corresponding points are then acquired. Finally, image conversion (reconstruction) is executed. That is, in place of searching pixels of other frames for the positions of the corresponding points, the positions of the corresponding points are determined in advance, and pixels of other frames corresponding to these positions are then searched. Using this method, it is guaranteed that the corresponding points exist at intermediate positions with respect to the given low-resolution pixels. Therefore, the aforementioned problem can be solved.

The basic principle of the embodiments has been described, and the super-resolution processing that uses the initially set virtual corresponding points intact can achieve a certain estimation precision. However, the positions which perfectly match the virtual corresponding points often exist at non-integer pixel positions, and points that perfectly correspond to such virtual corresponding points cannot be found as long as the search confined to integer pixel positions is conducted. In contrast, (1) by deviating the virtual corresponding points to the decimal precision to perfectly correspond to corresponding integer pixel positions on other frames, or (2) by determining perfectly corresponding non-integer pixel positions on other frames, and generating intensity values at the calculated non-integer pixel positions by interpolation, the estimation precision of a high-resolution image can be further improved upon applying the aforementioned basic idea of the embodiments intact. When the method of deviating the virtual corresponding points is adopted, it is no longer guaranteed that the corresponding points exist at intermediate positions with respect to the given low-resolution pixels, but the estimation precision of a high-resolution image can be improved since corresponding points near desired positions are obtained with a higher possibility than the method of the related art. Note that the aforementioned concept that virtual corresponding points (virtual sampling points) are set, points corresponding to the virtual corresponding points are searched, and sampling rate conversion is executed by reconstruction after the virtual corresponding points are corrected if needed, is not limited to two-dimensional images, and can be directly applied to, e.g., a one-dimensional signal.

The method of the embodiments is designed based on the idea that all pieces of available information are used, and can be used not only for a case which is assumed by many super-resolution processes, and in which inputs are a plurality of two-dimensional data items, but also to one two-dimensional data item. Since two-dimensional data is not indispensable, the method of the embodiments can also be used for audio data which is input and output one-dimensionally, and three-dimensional image data in which each voxel having length, width, and height as axes has an intensity value. More generally speaking, the embodiments execute signal processing having (A) one or (B) a plurality of N-dimensional data items (N is a natural number) of a low sampling rate as input data so as to obtain N-dimensional data of a high sampling rate as output data. Note that data called N-dimensional data is defined as a set of positions (sampling points) indicated by N-dimensional coordinate values in an N-dimensional space, and values (sampling values) associated with these positions. Typically, sampling points are normally allocated at equal intervals in the N-dimensional space. Their sampling values may be either one-dimensional scalar data or multidimensional vector data.

In the embodiments, the basic principle will be described taking a general one-dimensional signal including audio data as an example. Then, a two-dimensional image will be taken as an example. Extension to multidimensional data (three or more dimensions) will be explained later. The following description will be given on the condition that a sampling value is linear with respect to the strength of a signal, unless otherwise specified. This condition is met intact for a signal value of sound sampled by the linear PCM method. Even when this condition is not met, the following method can be directly applied. However, the method may be applied after a sampling value to be used is restored to that of a linear signal. For example, if a sampling value is a signal value obtained via a logarithmic compression device like G.711, it may be decompressed, and the following method may then be applied. Alternatively, if a signal is a sampling value after gamma conversion such as an intensity value of an image, the following method may be applied after that sampling value undergoes gamma correction to restore a sampling value for a linear signal. After such correction, an output signal may undergo inverse correction if needed.

According to the signal processing method, apparatus, and program of the embodiments, sampling rate conversion that converts a set of sampling values in the N-dimensional space can be executed with higher precision than the related art.

First Embodiment

This embodiment will explain a case in which a general one-dimensional signal including audio data is used as input and output data of a signal processing apparatus.

(Basic Theory of Reconstruction)

A question of calculating a one-dimensional signal value upon discretizing, at a higher sampling rate (output sampling rate), an input one-dimensional signal obtained by sampling an unknown signal (source signal) at a certain sampling rate (input sampling rate) will be examined. Sampling values y(T1), y(T2), y(T3), . . . of a one-dimensional signal with respect to times T1, T2, T3, . . . are input. T1, T2, T3, . . . indicate not specific moments, but individual short sampling durations. FIG. 4 is a conceptual view of a sampling process. Various models of the sampling process are available. For example, the average value of a source signal within each sampling time can be used as a model. For example, assume that the sampling value y(T1) gives the average value of a (unknown) source signal within the time T1. A problem is to obtain sampling values x(T'1), x(T'2), x(T'3), . . . for times T'1, T'2, T'3 at the output sampling rate using the given sampling values y(T1), y(T2), y(T3), . . . for the times T1, T2, T3, . . . at the input sampling rate.

Figure 5:
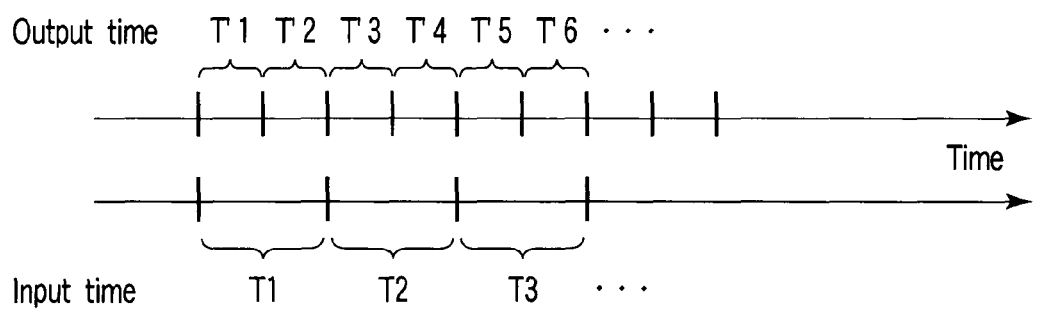
FIG. 5 is an exemplary view for explaining sampling rate conversion.

For example, a case will be examined below wherein the output sampling rate is twice the input sampling rate, as shown in FIG. 5. Upon examining the model in which each sampling value gives the average value of a source signal, equations:

$$y(T1)=(½)x(T'1)+(½)x(T'2)$$

$$y(T2)=(½)x(T'3)+(½)x(T'4)$$

$$y(T3)=(½)x(T'5)+(½)x(T'6)$$

can be set between sampling values. Note that the number of equations as inputs is as many as the number of the times T1, T2, T3, . . . on the input sampling rate, while the number of unknowns x(T'1), x(T'2), x(T'3) . . . is as many as the number of the times T'1, T'2, . . . of the output sampling rate. Hence, there are a large number of combinations of x(T'1), x(T'2), x(T'3), . . . which satisfy these equations. Therefore, a solution needs to be selected using any additional information from an large number of combinations of solutions. There are two selection methods: one is to add equations, and the other is to constrain solutions using knowledge about the unknowns x(T'1), x(T'2), x(T'3), . . . . The signal processing apparatus of this embodiment uses the method of adding new equations of these two methods.

How the signal processing apparatus of this embodiment adds equations will be explained later, and a method of solving these equations, i.e., a method of assigning appropriate unknowns x(T'1), x(T'2), x(T'3), . . . will be explained first.

The above example when the output sampling rate is twice the input sampling rate is transcribed in a general format. Indices i={0, 2, 3, . . . , L} are assigned to the input times, and the sampling values of an input one-dimensional signal are expressed by:

$y_1, y_2, y_3, \ldots$

Indices j={1, 2, 3, . . . , M} are also assigned to output signals, and the sampling values are expressed by:

$x_1, x_2, x_3, \ldots$

In the above example, a simple average is assumed as the sampling process. This sampling process is generalized to assume that input sampling values are given as a weighted sum of output sampling values. Values to be calculated are sampling values:

$x_1, x_2, x_3, \ldots$

At this time, by expressing, for each index i, a weighting coefficient by:

$w_{ij}$ we have:

$$y_i = \sum_j w_{ij} x_j$$

If there are times in which a weighted sum value of output sampling values can be estimated in addition to the input times, indices are assigned to these times in the same manner as the input times to add equations, and the value L is increased in correspondence with the number of added equations.

By introducing
a vector:

$$x=(x_1,x_2,x_3,\ldots,x_M)^T$$

a vector:

$$x=(x_1,x_2,x_3,\ldots,x_M)^T$$

and a matrix:

$$W=((w_{11},w_{12},\ldots,w_{1M})^T,(w_{21},w_{22},\ldots w_{2M})^T,\ldots)^T$$

the equations for respective indices i are collectively described by:

$$y=Wx$$

As a method of assigning x, a method of calculating x using a pseudo inverse matrix by:

$$x=W^+y$$

is available. In place of directly assigning x using the pseudo inverse matrix, for example, POCS and MAP methods may be used. The method of assigning x using W and y will be referred to as "RECONSTRUCTION" hereinafter.

(Interpolation)

The POCS or MAP method normally executes optimization based on iterative calculations, and such optimization needs initial signals x as initial values. The initial signals x can be generated by, e.g., interpolating input signals. An interpolation method to be used is not particularly limited. For example, the following methods can be used.

(A) Linear Interpolation

Interpolation is executed using given two points. The two points used in interpolation are as near a point to be interpolated as possible. If the positions of the given two points are expressed by:

$a_1, a_1+1$ their sampling values are expressed by:

$y_1, y_2$ and, the position of the point to be interpolated is expressed by:

$a_1+C$ an interpolated value is calculated by:

$$y_c=y_1+c(y_2-y_1)$$

(B) Cubic Convolution Interpolation

Interpolation is executed using given four points which are located at equal interval. Assume that the four points used in interpolation are allocated within a range of 2 or less having a position to be interpolated as the center. An interpolated value is obtained by multiplying the respective points by the value of a weighted Kernel which has the position to be interpolated as the center, and is given by:

$$w(d) = \begin{cases} (\gamma+2)|d|^3 - (\gamma+3)|d|^2 + 1 & |d| < 1 \\ \gamma|d|^3 - 5\gamma|d|^2 + 8\gamma|d| - 4\gamma & 1 \le |d| < 2 \\ 0 & \text{otherwise} \end{cases}$$

where d is the distances of the respective points from the position to be interpolated, and γ is a parameter used to control an interpolation function, and is, for example, γ=−1.0 or γ=−0.5
and by calculating the sum of these products.

(Back Projection and POCS)

Figure 6:
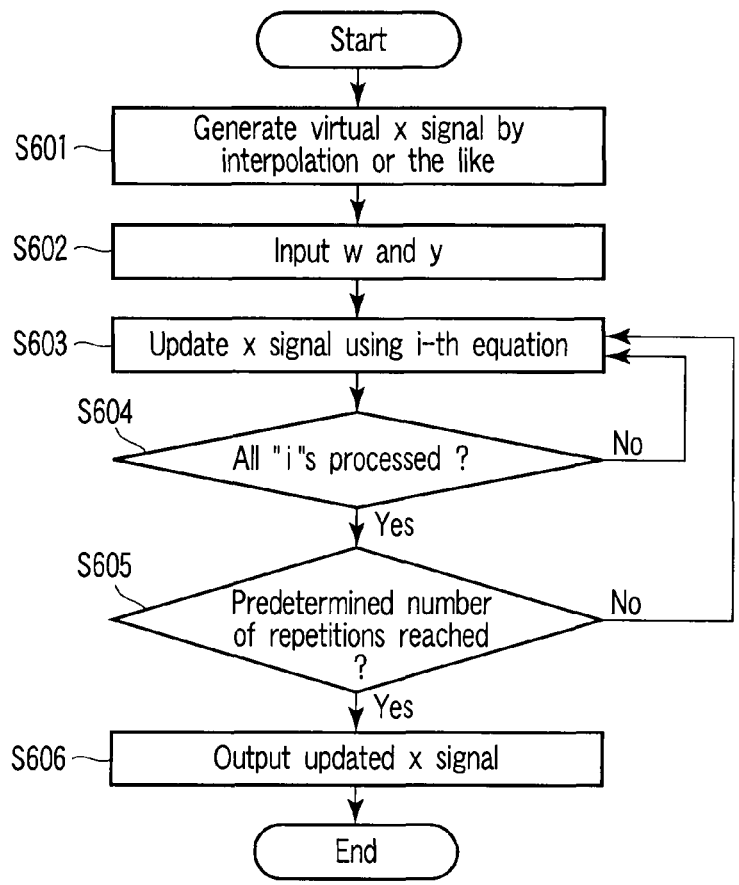
FIG. 6 is an exemplary flowchart of sampling rate conversion by POCS.

FIG. 6 is an exemplary flowchart of the sequence of the RECONSTRUCTION based on POCS. The algorithm of the RECONSTRUCTION is as follows. This algorithm is executed by, e.g., a calculation unit 702 in FIG. 7.

(Step 1) An initial signal x is generated (S601). The initial signal x can be generated by, e.g., interpolating input signals. The interpolation can use, for example, the linear interpolation or cubic convolution interpolation.

(Step 2)

The i-th equation which forms:

y=Wx can be written in the following form:

$y_i = W_i x$ where $W_i = (w_{i1}, w_{i2}, \ldots w_{iM})$ is a horizontal vector defined by arranging weights, and
$y_i, W_i$
is given as an input (S602). In order to calculate x which meets:

$y_i = W_i x$ without being influenced by noise, POCS separately gives a step size:
$\beta_i$
and a constant:
$\delta_i$
and executes the following iterative calculations (an example without parallelization: S603 and S604). Note that
$\hat{x}$
means an estimated value of x.

$$\hat{x} \leftarrow \begin{cases} \hat{x} + \beta_i(y_i - W_i\hat{x} + \delta_i) & \text{if } y_i - W_i\hat{x} + \delta_i < 0 \\ \hat{x} + \beta_i(y_i - W_i\hat{x} - \delta_i) & \text{if } y_i - W_i\hat{x} - \delta_i > 0 \\ \hat{x} & \text{otherwise} \end{cases}$$

The step size:
$\beta_i$
and the constant:
$\delta_i$
may assume, for all indices i, identical values (for example, $\beta_i=1, \delta_i=10$), or they may be changed for each equation like:

$\beta_i = 1/\|W[i]\|^2$ (Step 3) Step 2 is repeated by the predetermined number of times (S605).

(Step 4) The updated signal:
$\hat{x}$
is output (S606).

With the above sequence, the signal x can be estimated. The precision of the estimation of x is increased when the rank of the matrix W is increased, i.e., when the dimensions of the possible solutions x is decreased by the equations utilized for the estimation of x. The precision of the estimation of x also depends on the preciseness of the equations. An overview of that reason will be described below. When the number of dimensions of possible solutions x is not zero, the RECONSTRUCTION such as POCS or the like selects and returns one of these solutions (strictly speaking, approximate solutions). However, the natures of signals are not considered in the process of the RECONSTRUCTION, and an estimated signal is randomly selected from the possible solutions (by inappropriate criteria viewed from the user). Such selection does not pose a serious problem when the number of possible solutions x is small. However, as the number of dimensions of possible solutions x increases, the number of choices of solutions x also increases, and a desired signal is unlikely to be selected. When the MAP method to be described later is used as the RECONSTRUCTION, the dimension of the possible solutions x is decreased and thus a solution x can be selected using knowledge about the signal. However, when the number of dimensions of possible solutions x increases, a desired signal is also unlikely to be selected. In consideration of such drawbacks, decreasing the number of dimensions of possible solutions x in sampling rate conversion using the RECONSTRUCTION becomes a very important issue.

(Simple RECONSTRUCTION)

In place of the strict RECONSTRUCTION, the following weighted addition method can be used. In the weighted addition method, an appropriate Kernel matrix K is prepared, and a signal x for each sampling time is estimated by:

x=Ky

In theory, the Kernel matrix K is the pseudo inverse matrix of W:

$W^+$

However, the computational cost for computing the pseudo inverse matrix is high. To avoid computing the pseudo-inverse matrix, a matrix K which has non-zero weights on the sample near start and end times is used in the weighted addition method. For each row of K, the sum of elements is 1 since the elements of each row represent coefficients of interpolation.

(Sequential Processing of Audio Using Sliding Window)

When the equations of the RECONSTRUCTION are used intact, values y are input together, and values x are collectively estimated based on the input values y. However, when the embodiment is applied while sampling an audio signal, and the result is output, it is difficult to collectively obtain all values y. In such a case, for example, the following method can be used.

A buffer which can hold certain samples (for example, about 100 to 10000 samples) is prepared in advance. Every time an input sample is obtained, new data is recorded in the buffer. When the buffer is full of data, sampling rate conversion is applied to the samples held in the buffer to output obtained values x. After that, the buffer is cleared, and the same operations are repeated. When this method is simply implemented, noise may be generated at the time when the buffer is full of data (boundary time). To reduce the noise caused by this problem, the following method can be used: the buffer is not completely cleared to leave some samples, some x signals are generated twice near the boundary time, and a weighted sum of the two x signals is output near the boundary time.

(Method of Increasing Equations: One-Dimensional Corresponding Point Estimation)

As can be seen from the above description, an equation, which expresses an input signal (source signal) as a weighted sum of output signals, can reduce the number of possible solutions, and is precise, need only be obtained.

Figure 7:
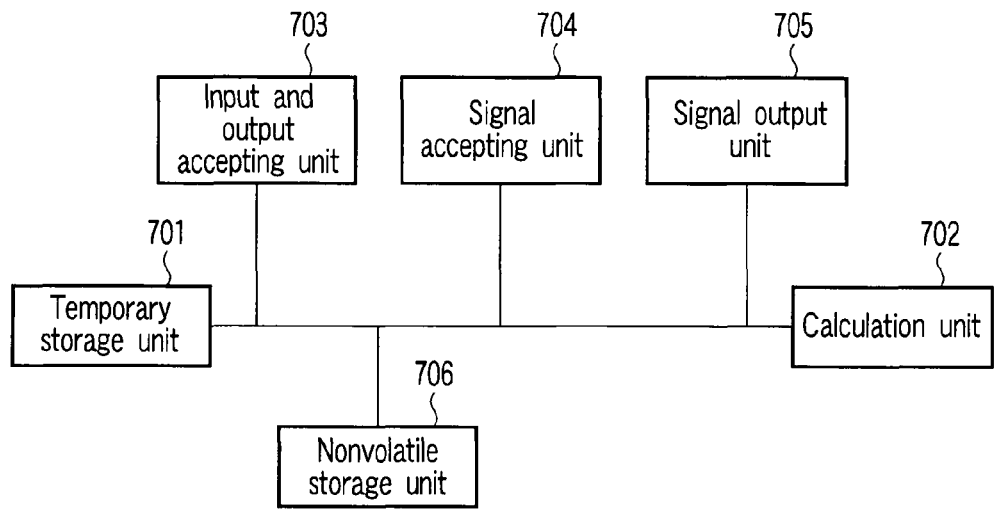
FIG. 7 is an exemplary block diagram of a signal processing apparatus according to an embodiment.

The signal processing apparatus of this embodiment will be described below with reference to FIG. 7. FIG. 7 shows an example of the arrangement when the information processing apparatus is implemented by a computer (including a TV, DVD player, and hard disk recorder) using a general-purpose CPU.

The signal processing apparatus of this embodiment includes a temporary storage unit 701, calculation unit 702, input and output accepting unit 703, signal accepting unit 704, signal output unit 705, and nonvolatile storage unit 706.

The input and output accepting unit 703 accepts an instruction from the user. The input and output accepting unit 703 accepts an instruction input using a mouse, keyboard, or remote controller. The input and output accepting unit 703 accepts a signal which instructs to launch a program.

The signal accepting unit 704 accepts input data as a set of sampling values in an N-dimensional space, and signal data (search pattern data), which are to undergo a search, as sets of sampling values in one or more N-dimensional spaces. In the first embodiment, these input data and signal data are respectively one-dimensional data (for example, audio data).

Figure 8:
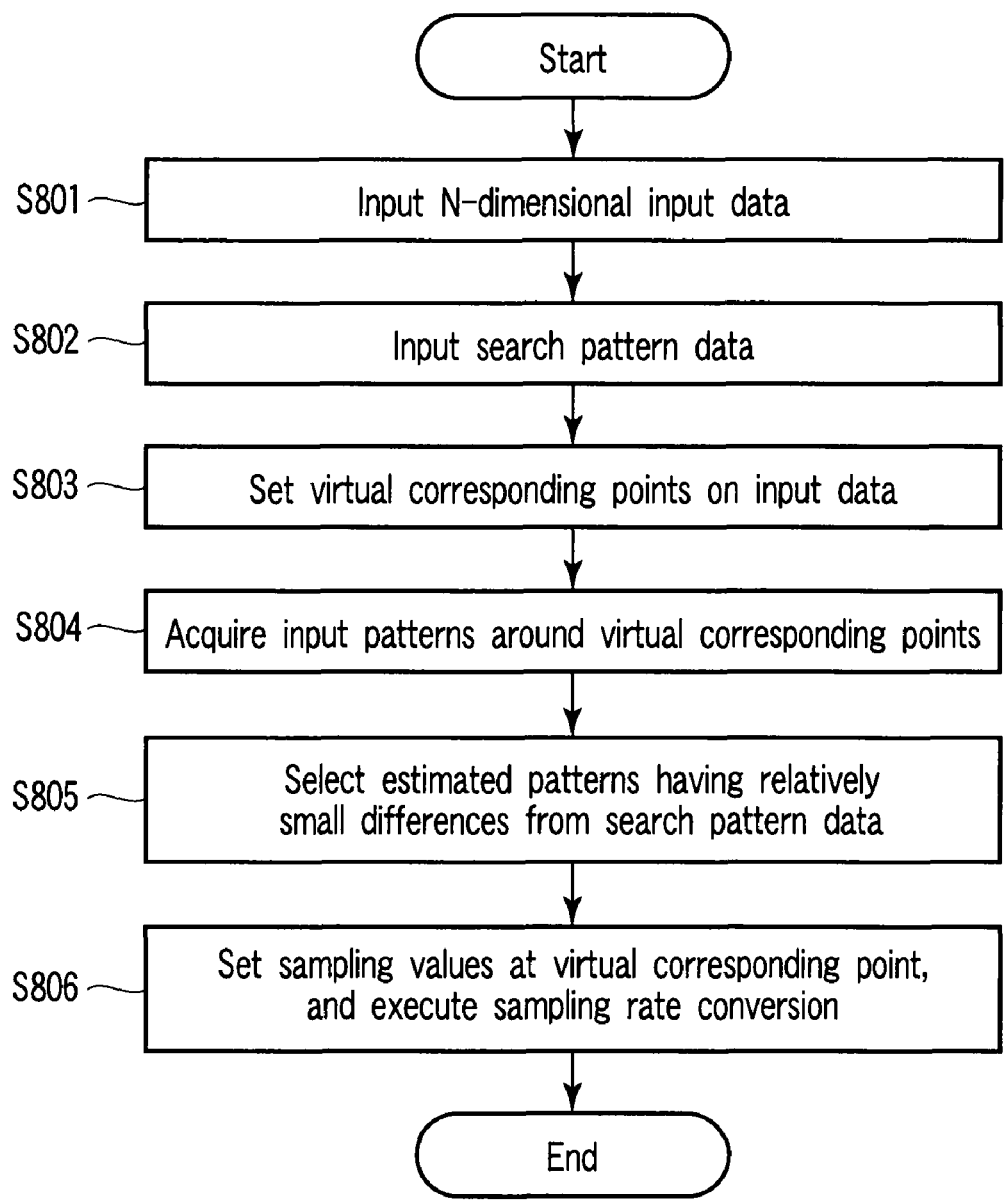
FIG. 8 is an exemplary flowchart showing the operation in the first embodiment of the signal processing apparatus shown in FIG. 7.

The nonvolatile storage unit 706 stores a program to be described later with reference to FIG. 8. The nonvolatile storage unit 706 comprises, e.g., a hard disk or ROM. The nonvolatile storage unit 706 may store the aforementioned input data and signal data in advance.

The temporary storage unit 701 accepts the user's instruction from the input and output accepting unit 703 to temporary store the program from the nonvolatile storage unit 706, and provides the stored program to the calculation unit 702. The temporary storage unit 701 can temporarily store the calculation result of the calculation unit 702.

The calculation unit 702 receives the program from the temporary storage unit 701, and executes the program.

The signal output unit 705 outputs the result obtained by the calculation unit 702. The signal output unit 705 comprises, for example, a loudspeaker in the case of audio data or a monitor in the case of image data.

An example of the operation of the signal processing apparatus shown in FIG. 7 will be described below with reference to FIG. 8.

(Step 1) The signal accepting unit 704 inputs input data to be processed (S801). The signal accepting unit 704 inputs signal data (search pattern data) which are to undergo a search (S802). Note that the search pattern data may be a source signal itself. The signal accepting unit 704 may input data stored in the temporary storage unit 701 or nonvolatile storage unit 706.

Figure 9:
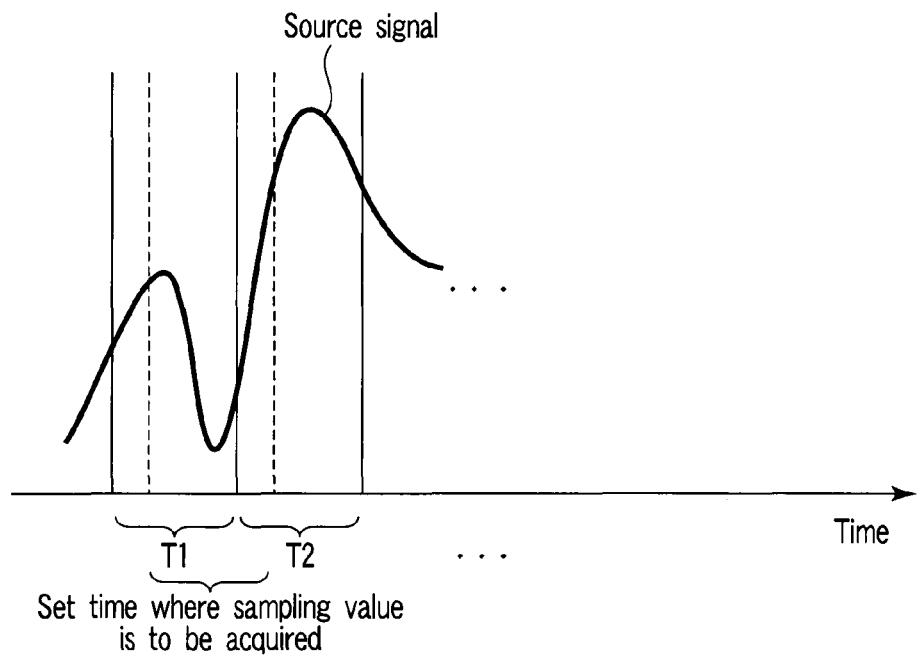
FIG. 9 is an exemplary view for explaining step S803 in FIG. 8.

(Step 2) The calculation unit 702 decides times from which sampling values are to be acquired from the given input data, as shown in FIG. 9 (S803). That is, the calculation unit 702 sets times which can reduce the number of possible solutions x if their sampling values are detected (virtual sampling times; in this case, a virtual corresponding point is set at the center of each virtual sampling time). For example, if the virtual sampling times are allocated at output sampling rate intervals, independent linear equations as many as the number of dimensions of x are obtained when all the sampling values in the set virtual sampling times are detected, and the number of possible solutions x can be limited to one. Note that the sampling values in the set times are unknown at this time. The temporary storage unit 701 temporarily stores the obtained result if needed.

Figure 10:
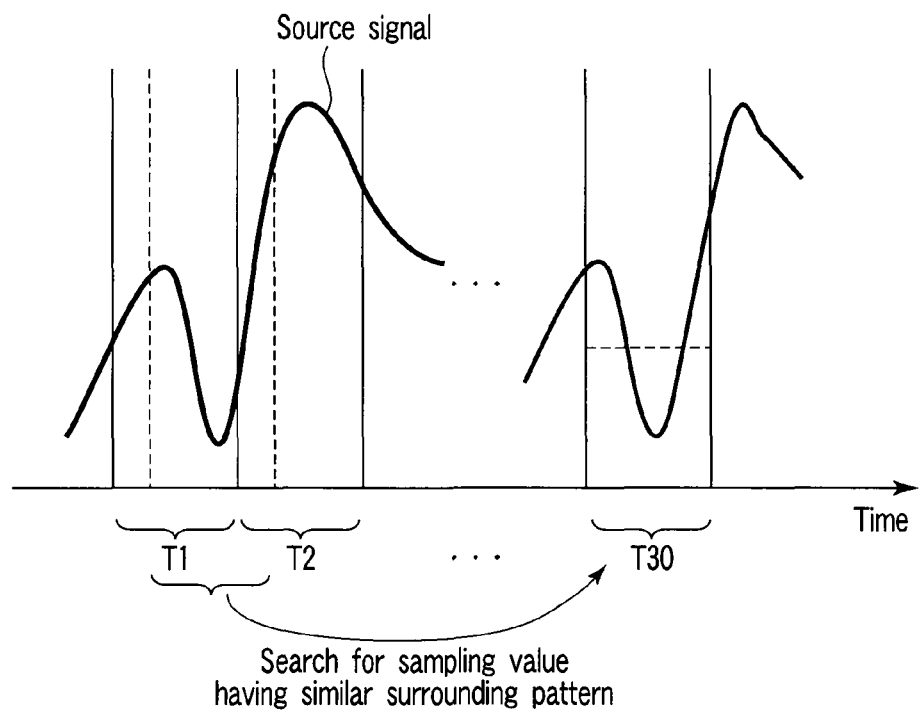
FIG. 10 is an exemplary view for explaining step S804 in FIG. 8.

(Step 3) The calculation unit 702 searches, using the temporary storage unit 701, the search pattern data for sampling values corresponding to sampling times which are similar to surrounding patterns of the virtual sampling times (more specifically, patterns of sampling values within a predetermined range with reference to the virtual sampling times). For example, the calculation unit 702 sets a source signal itself (except for the virtual sampling times themselves) as the search pattern data, and searches the source signal for sampling values having similar surrounding patterns, as shown in FIG. 10. More specifically, the calculation unit 702 generates a signal pattern having the same interval as the input sampling rate based on each virtual sampling time and appropriate times before and after that sampling time (for example, the virtual sampling time and two sampling times before and after that sampling time) (S804). The calculation unit 702 then searches the input signal for a signal pattern (estimated signal pattern or estimated pattern) having a minimum difference (to be referred to as a signal pattern error hereinafter) from the generated interpolated signal pattern (S805), thereby finding a sampling value corresponding to each virtual sampling time. At this time, the found sampling value at a position corresponding to the virtual sampling time in the signal pattern is considered as a sampling value in the virtual sampling time. In step S805, the calculation unit 702 may find a search pattern which has a difference from an input pattern at a certain ratio or less (that is, a signal pattern error is less than or equal to a certain threshold) of a plurality of search patterns from the search pattern data, or may find a similar search pattern, which has a smallest difference from the input pattern compared to other search patterns, and a search pattern which has a difference from this similar search pattern at a certain ratio or less (for example, the difference is 10% or less) of a plurality of search patterns from the search pattern data.

The signal pattern error can be evaluated by, for example, determining that the difference is greater with increasing total value of square errors of signals or that of absolute value errors, or with decreasing normalized cross-correlation. Note that a predetermined filter, for example, a low-pass filter which removes high-frequency components or a bandpass filter which passes only specific frequency components may be applied to evaluate the square errors, absolute value errors, or normalized cross-correlation values of filtered signals.

(Step 4) The calculation unit 702 adds equations including a coefficient upon expressing the sampling process in each virtual sampling time by the weighted sum of output signals, which coefficient is given by:

$w_{ij}$ and a found sampling value given by:

$y_i$, and executes the RECONSTRUCTION for obtained W and y (S806). In addition, for example, when a sampling value is found by evaluating some converted value like a normalized cross-correlation value in step 2 (S803), the sampling value can be corrected by inverse correction with respect to the executed conversion. As a method of correcting the sampling value, for example, the following method can be used. That is, linear conversion for a signal pattern found in the search pattern data is considered, linear conversion parameters that minimize a square error from an interpolated signal pattern used in collation are calculated or searched for, and a value obtained by applying the linear conversion using the obtained parameters to the sampling value found in the search pattern data is defined as:

$y_i$

The obtained result may be output via the signal output unit 705 or may be stored in the nonvolatile storage unit 706.

Using the aforementioned method, since the virtual sampling times are selected in step 1 to reduce the number of possible solutions x, if signals which have sufficiently small differences from signal patterns are found in step 2, the estimation precision of the output signals can be improved.

Note that the RECONSTRUCTION using estimated corresponding pattern has an effect similar to sampling of signals at a higher sampling rate. Therefore, in the sampling process of an input signal, the cutoff frequency of a low-pass filter to be applied may be set to be higher than the Nyquist frequency of a signal to be sampled.

The definition "within the predetermined range with reference to the virtual sampling time" in step 3 can use a definition "within a range about several to several hundred times a sampling interval before and after the virtual sampling time".

(Normalization for Audio Signal)

Note that the use of the normalized cross-correlation described above is effective for a periodic signal which is generated from a sound source and is attenuated gradually like a sound produced by a musical instrument. Also, the use of the normalized cross-correlation is effective for a case in which a sound generated by a sound source is reflected by a wall or the like, and an identical pattern is obtained at different sampling positions. Note that a signal pattern with a low S/N ratio may be selected upon simply evaluating using only the normalized cross-correlation. To solve this problem, upon evaluating using the normalized cross-correlation, only a period in which the signal level of a search pattern (for example, the value of a signal corresponding to the largest absolute value of the sampling value in the search pattern when a silent state is 0) is greater than or equal to a predetermined value may undergo the search.

(One-Dimensional Corresponding Point Estimation: Correction)

Figure 11:
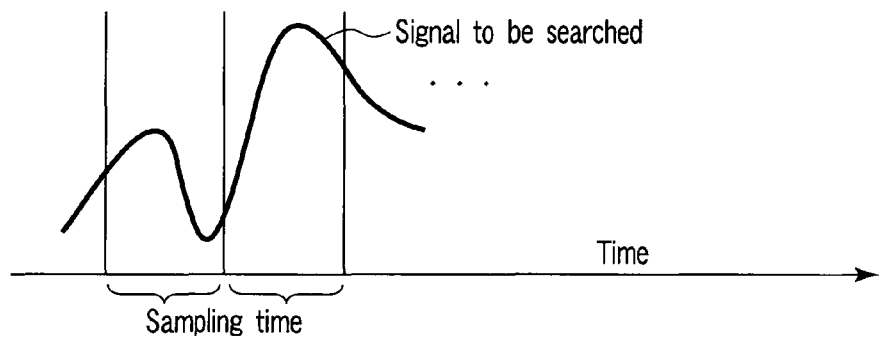
FIG. 11 is an exemplary view showing a reference signal used to explain step S805 in FIG. 8.
Figure 12:
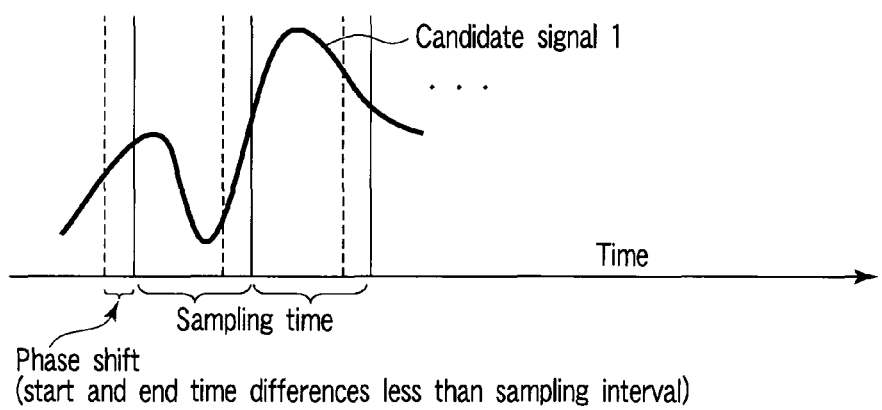
FIG. 12 is an exemplary view showing candidate signal 1 used to explain step S805 in FIG. 8.
Figure 13:
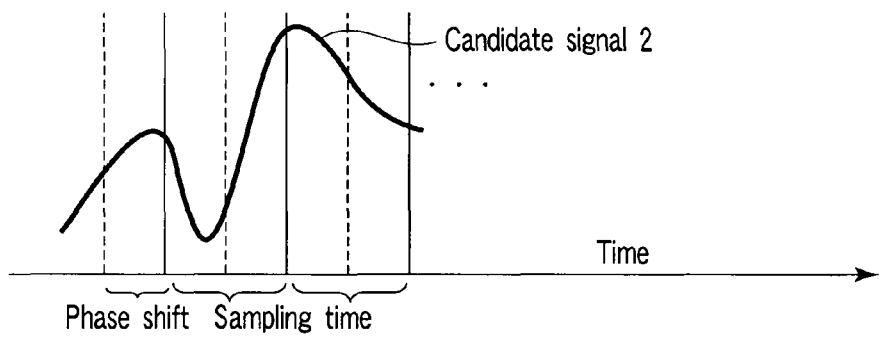
FIG. 13 is an exemplary view showing candidate signal 2 used to explain step S805 in FIG. 8.

The search for an estimated signal pattern in step 3 (S805) is conducted discretely (more specifically, to the precision of the sampling intervals). The estimated signal pattern obtained by this search is a signal pattern which has not only a small signal pattern error of signal patterns as candidates but also a small difference from the virtual sampling time, with reference to the set virtual sampling time. That is, in the found estimated signal pattern, it is expected that differences of its sampling start and end times less than a sampling interval (to be referred to as a phase shift hereinafter) are small. Note that selecting a signal pattern with a small phase shift is as follows. More specifically, upon searching for a signal pattern similar to a reference signal pattern shown in FIG. 11, when candidate signal 1 (FIG. 12) and candidate signal 2 (FIG. 13) are available as candidate signals, a signal pattern of candidate signal 1 whose decimal differences of its sampling start and end times are smaller is selected. In consideration of differences in the positive and negative directions with respect to the time axis, the phase shift never exceeds half of the sampling interval.

However, even when a signal pattern with a small phase shift is obtained in step 3 (S805), a signal whose phase shift from the virtual sampling time is sufficiently close to zero is not always found. In order to improve the estimation precision of output signals in such a case, a phase shift is estimated, and either of (A) a method of correcting the virtual sampling time which is set first or (B) a method of correcting a sampling value may be executed. Upon applying these methods, the phase shift amount needs to be estimated first.

As one method of finding the phase shift amount, a binary search using an interpolated signal pattern can be used. With this method, let $\Delta t$ be an estimated phase shift, and $\epsilon$ be the phase shift precision. Then, the phase shift amount is estimated by the following sequence.

(Step 1) $\Delta t=0$ and $\epsilon=\frac{1}{2}$ are set.

(Step 2) Assuming that $\Delta t$, $\Delta t-\epsilon$, and $\Delta t+\epsilon$ are phase shift candidates, input signal patterns (input patterns) shifted by the respective phase shift candidates are generated by interpolating input signals.

(Step 3) The generated input signal patterns are respectively compared with the estimated signal pattern, and $\Delta t$ is updated by the phase shift candidate value that yields the smallest signal pattern error.

(Step 4) If $\epsilon$ is lower than or equal to desired (predetermined) precision, $\Delta t$ is output, thus ending this sequence. Otherwise, $\epsilon \leftarrow \frac{1}{2}\epsilon$ is set, and the process returns to step 2.

Figure 14:
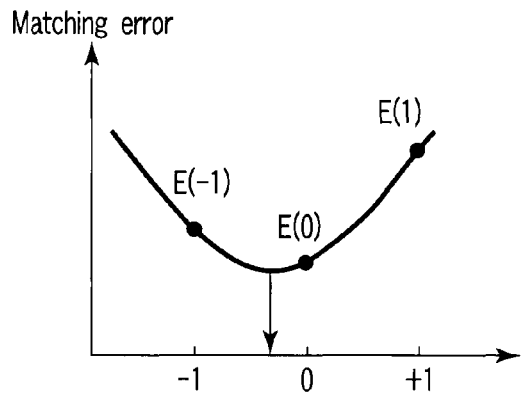
FIG. 14 is an exemplary view showing function fitting when an error function is a quadratic function.

As another method of finding a phase shift amount, an estimation method using an error function of an interpolated signal pattern can also be used. For example, upon approximating an error function by a quadratic curve, letting $E(0)$ be a signal pattern error with respect to an input signal pattern, and $E(1)$ and $E(-1)$ be signal pattern errors with respect to the input signal pattern, which are shifted by one sampling time in the positive and negative directions, the phase shift can be estimated, as shown in FIG. 14, by:

$$subpixel = \frac{E(1)-E(-1)}{2\{2E(0)-E(1)-E(-1)\}}$$

The approximation using the quadratic curve is effective for, for example, a case in which the total value of square errors is used as a signal pattern error. On the other hand, when an error function is approximated by a piecewise line segment, the phase shift can be estimated by:

$$subpixel = \begin{cases} \dfrac{E(-1)-E(1)}{2\{E(1)-E(0)\}} & E(-1) <= E(1) \\ \dfrac{E(-1)-E(1)}{2\{E(-1)-E(0)\}} & E(-1) > E(1) \end{cases}$$

Such approximation is effective for, for example, a case in which the total value of absolute value errors is used as a signal pattern error.

When the phase shift estimated by the aforementioned method is obtained, the two different methods of correcting the sampling time or value using the estimated phase shift can be used, as described above. When the aforementioned method (A) is used, the virtual sampling time is shifted by the estimated phase shift. When the method (B) is used, a sampling value for the sampling time shifted by the estimated phase shift is estimated by interpolation. As the interpolation method, the aforementioned linear interpolation and cubic convolution interpolation can be used.

(Merits of Method of this Embodiment Compared to Conventional Method)

Superiority of the method of this embodiment to the conventional method will be described below. With the conventional method, signal patterns which do not practically contribute to a reduction of the number of dimensions of possible solutions x are normally found by a search, and possible solutions x cannot be sufficiently limited. Details are as follows. Conventionally, the super-resolution processing executes an operation for searching for another time corresponding to each sampling time at the input sampling rate. As an example, a case will be described below wherein a search using a normalized cross-correlation value as a signal pattern error is conducted. If an input signal pattern is a part of a signal in which an identical phase-shifted waveform repetitively appears like a periodic waveform, there is a nature that a signal pattern which has a small phase shift (close to zero) is extremely more likely to be selected. This nature has been described. For example, upon searching for a signal pattern similar to a reference signal pattern shown in FIG. 11, if candidate signal 1 (FIG. 12) and candidate signal 2 (FIG. 13) are available as candidate signals, a signal pattern of candidate signal 1 which has smaller decimal differences of its sampling start and end times is selected due to a small signal pattern error (in this case, normalization). Therefore, as long as a search is conducted in correspondence with each sampling time of an input signal as in the conventional method, a signal pattern whose phase shift is close to zero is preferentially selected. Such signal pattern whose phase shift with respect to the sampling time of an input signal is close to zero does not contribute to a reduction of the number of dimensions of possible solutions x in the sampling rate conversion. The reason for this is as follows. When a signal pattern whose phase shift is completely zero is found as a result of a search, since the sampling process for obtaining a sampling value found from an output signal is quite the same as one of the input sampling times, a coefficient of W in each equation to be added is quite the same as one of the input sampling times. As a result, the number of dimensions of possible solutions x cannot be reduced even by adding equations. When a phase shift is close to zero, a coefficient of W which is slightly different from that of W for one of the input sampling times is obtained. However, in consideration of the influence of noise, if these coefficients have a small difference, there is no value for practical use, and the number of dimensions of possible solutions x cannot be reduced in practice. That is, in the conventional method, due to the nature of the search that preferentially selects a signal pattern whose phase shift is close to zero, the number of dimensions of possible solutions x cannot be sufficiently reduced. As a result, an estimated signal that the user does not want is output, and an output signal with low quality is output, as described above.

On the other hand, an important characteristic feature of the method of this embodiment is that virtual sampling times are set initially. In this embodiment, the virtual sampling times are set even by spending extra calculation cost. Then, in place of searching for a signal pattern corresponding to each input sampling time unlike in the conventional method, a signal pattern corresponding to each virtual sampling time is searched for. This change largely contributes to a reduction of the number of dimensions of possible solutions x, as will be described below. The nature of the search, i.e., the nature itself that obtains a signal pattern having zero phase shift with respect to a reference signal pattern remains unchanged like the conventional method. However, that reference signal pattern is acquired with reference to each sampling time of an input signal in the conventional method, while it is generated by interpolation with reference to each virtual sampling time in this embodiment. Since each virtual sampling time is set with reference to, e.g., an output sampling time, that reference signal pattern is generally a signal pattern which has a non-zero phase shift in view of the time axis of an input signal. In other words, a search that preferentially searches for a pattern which has zero phase (when the virtual sampling time is not corrected) or a phase shift close to zero (when the virtual sampling time is corrected) with respect to a reference signal pattern using a signal pattern having a nonzero phase shift as the reference signal pattern is conducted. Therefore, a signal pattern preferentially selected as a result of the search is normally that having a nonzero or desired phase shift. When coefficients of a matrix W with respect to the time having the desired phase shift and the corresponding sampling value are obtained, the number of dimensions of possible solutions x can be reduced. In particular, in an ideal case in which all the phase shifts of the times obtained as a result of the search are desirable, the matrix W which uniquely specify a solution x and the vector y of the corresponding sampling value are obtained, and a quality drop of an output signal due to ambiguity of estimated signals x of the RECONSTRUCTION can be perfectly removed. Even when the obtained W and y are not ideal, W and y are obtained using the setting of the virtual sampling times as a characteristic feature of this embodiment, the ambiguity of estimated signals x in the RECONSTRUCTION can be eliminated, and an output signal with higher quality can be obtained.

(Extension when Highly Correlated Data Exist)

When an input signal is audio data, for example, such data normally has two or more channels like stereo data and 5.1-channel (multichannel) data. In such a case, using data of another channel in addition to the source signal itself as search pattern data, a similar pattern is more likely to be found.

(Use of Code Book)

For example, when an input signal is audio data obtained by sampling a sound of a musical instrument, data having reproducibility is normally included. Therefore, by recording many data items in advance, a similar pattern is more likely to exist. In such a case, using data saved in advance in addition to the source signal itself as search pattern data, a similar pattern is more likely to be found.

(Removal of Unwanted Pattern)

The above description has been given under the assumption that good estimated signal patterns are found. However, signal pattern errors of the obtained estimated signal pattern are not always sufficiently small, and even when a signal pattern with a minimum signal pattern error is selected, it may be associated with an estimated signal pattern different from an input signal pattern. When such estimated signal pattern is obtained, it may impose adverse effects on the RECONSTRUCTION. To solve this problem, for example, the following method may be used. That is, a signal pattern error after the aforementioned correction with respect to a phase shift is evaluated, and if that error is greater than or equal to a threshold, the corresponding estimated signal pattern is removed, and is not used in the RECONSTRUCTION.

According to the aforementioned first embodiment, in the sampling rate conversion (one-dimensional data such as audio data or the like), since equations are added to y=Wx using the method of setting desired virtual sampling times or virtual sampling positions in advance, and finding corresponding sampling times or sampling positions, the ambiguity of estimated signals x can be reduced compared to the conventional signal, and an output signal can be estimated with higher precision than the conventional method.

Second Embodiment

The RECONSTRUCTION for a one-dimensional signal has been explained. As described above, the invention can be applied to an image as a two-dimensional signal. An embodiment associated with an image will be explained hereinafter.

This embodiment will explain a case in which input and output data of a signal processing apparatus correspond to a general two-dimensional signal including image data. The signal processing apparatus of this embodiment has the same arrangement as that shown in FIG. 7, except that a program for a two-dimensional signal is used unlike in the first embodiment.

(Extension to Two-Dimensional Signal)

In an image, a two-dimensional image corresponds to a signal, an intensity value or pixel value corresponds to a sampling value, a resolution corresponds to a sampling rate, a position in the horizontal and vertical directions corresponds to a time in a one-dimensional signal, and a pixel corresponds to a time duration. Note that a pixel fundamentally expresses a small area (normally, a square area) in an image. However, in the following description, a pixel expresses a representative position (central position of a pixel area) in a small area that expresses the pixel, and a variable corresponding to a time duration of a one-dimensional signal is described as a pixel area. Sampling rate conversion corresponds to conversion of input and output resolutions. An output vector:

$$x = (x_1, x_2, x_3, \ldots, x_M)^T$$

represents intensity values of respective pixels at a resolution to be output, and an input vector:

$$y = (y_1, y_2, y_3, \ldots, y_L)^T$$

represents those of respective input pixels. x and y are vector descriptions by sorting intensity values of two-dimensional pixels by assigning one-dimensional serial numbers (indices) to these pixels. An equation:

$$y_i = \sum_j w_{ij} x_j$$

expresses the sampling process of an input image from an output image, and a matrix W which combines its weighting coefficients:

$$w_{ij}$$

is called a Point Spread Function (PSF). Note that the sampling process may be different for each position. For example, it is desirable to use a PSF which spreads in a motion direction for a part where a motion blur has occurred. As a signal pattern, a two-dimensional rectangular block which has a pixel of interest as the center, and the length of one side of which is given by:

$$l_x, l_y$$

or an array of intensity values of pixels within a circle which has a diameter:

l may be used.

(RECONSTRUCTION)

Figure 15:
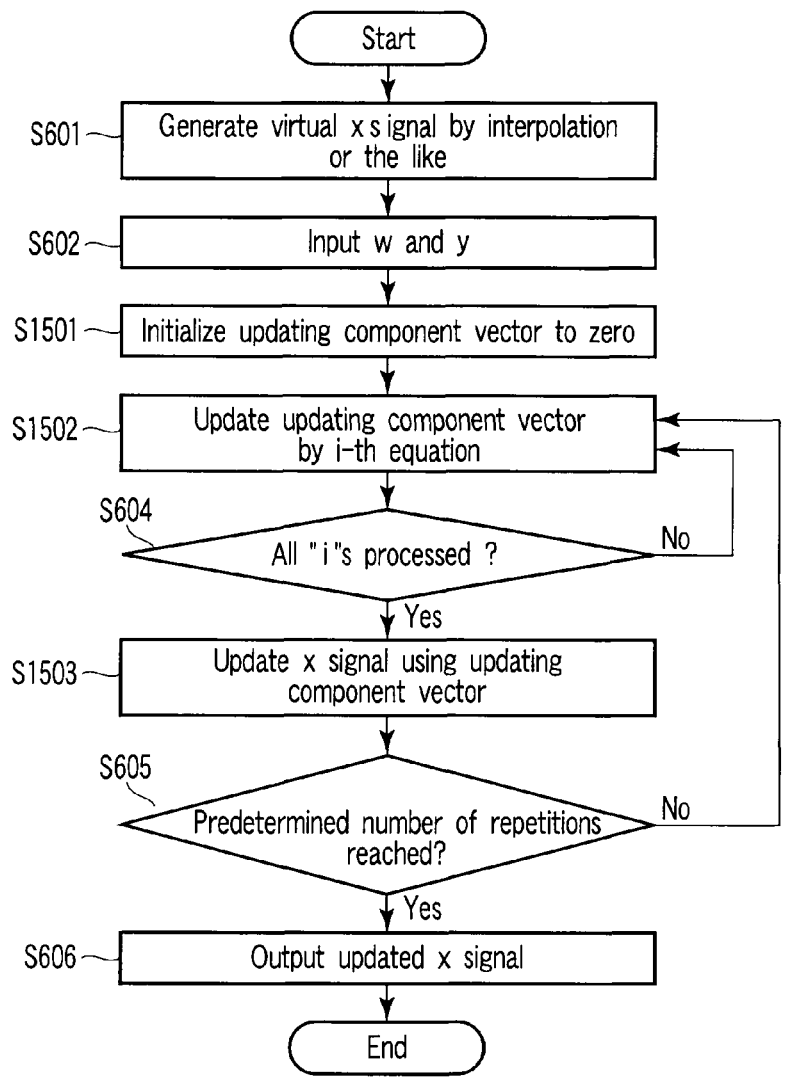
FIG. 15 is an exemplary flowchart of sampling rate conversion by MAP.

If the input vector y and its Point Spread Function (PSF) are given, estimation of x based on:

$$y = Wx$$

can be executed using the method described in the first embodiment intact. In an image, for example, knowledge unique to a signal like that neighboring pixels have similar intensity values can be given. In this case, x may be estimated using a MAP estimator to be described below. The MAP method will be described below with reference to the sequence shown in FIG. 15. A calculation unit 702 executes this processing.

(MAP)

(Step 1)

The calculation unit 702 generates an initial signal x (S601). The initial signal x can be generated by, e.g., interpolating an input signal.

(Step 2)

The calculation unit 702 assumes an energy function which combines two terms, i.e., a first term in which an energy becomes higher with increasing error with respect to an equation:

$$y = Wx$$

and a second term in which an energy becomes higher with increasing error of an image x with respect to a general nature of a natural image which is prepared in advance, and searches for an image x which minimizes that energy function. For example, as the general nature of a natural image, assuming that the intensity values of neighboring pixels do not so change, the energy function can be described by:

$$E = \|y - Wx\|_1 + \sum_m \lambda_m \|x - P_m x\|_1$$

where a subscript "1" of each norm represents an L1 norm, λm is a weight for the second term, and Pm is a matrix that expresses translation. m represents variations of possible translations, and for example, assuming, as Pm, two matrices:

P1: horizontal translation
P2: vertical translation the second term yields a value obtained by calculating the sum of differences of neighboring pixels in the vertical and horizontal directions, and weighting the total value by λ.

As a method of minimizing E, for example, a steepest descent method can be used. The steepest descent method repeats an operation for advancing a step obtained by multiplying an x estimated value:

$$\hat{x}$$

by $-\beta$ in the gradient direction of the energy function, and that updating can be implemented by:

$$\hat{x} \leftarrow \hat{x} - \beta \left\{ W^T \text{sign}(Wx - y) + \sum_m \lambda_m (I - P_m)^T \text{sign}(x - P_m x) \right\}$$

A practical sequence is as follows. The calculation unit 702 gives W and y as inputs (S602). Upon executing the above formula intact, the calculation unit 702 prepares a buffer (temporary storage unit 701) for holding a gradient vector of the energy function, and initializes it by zero (S1501). Next, the calculation unit 702 updates the gradient vector of the energy function (S1502, S604) by evaluating a formula of each row:

$$W^T \text{sign}(Wx-y)$$

and a formula of each row:

$$\lambda_m (I - P_m)^T \text{sign}(x - P_m x)$$

Upon completion of evaluation of all formulas, the calculation unit 702 makes a multiplication by β, and subtracts, from an estimated value:

$$\hat{x}$$

the product (S1503). In place of executing the above equation intact, by sequentially applying the above update formulas, i.e., the formula of each row:

$$W^T \text{sign}(Wx-y)$$

and the formula of each row:

$$\lambda_m (I - P_m)^T \text{sign}(x - P_m x)$$

as those which configure the gradient direction of the energy function (by excluding formulas other than a formula of interest from a gradient term), an estimated value:

$\hat{x}$ may be sequentially updated (in this case, the sequence is the same as that of steps S603 and S604 described previously as the POCS). Note that an initial value of the estimated value:

$\hat{x}$ is given by applying the linear interpolation, cubic convolution interpolation, or the like to a frame to be converted.

(Step 3) The calculation unit 702 repeats step 2 by the predetermined number of times (S605).

(Step 4) A signal output unit 705 outputs the obtained estimated high-resolution image:

$\hat{x}$ (S606).

Note that the energy function of the MAP method described above is an example, and the embodiment is not limited to such specific energy function. For example, either of the L1 norms of the energy function can be substituted by another norm (e.g., an L2 norm). Also, for example, the second term as a priori knowledge need not be used. This method is especially called an ML method, and corresponds to a case in which λm=0 in the above energy function.

(Estimation of Corresponding Point)

Figure 16:
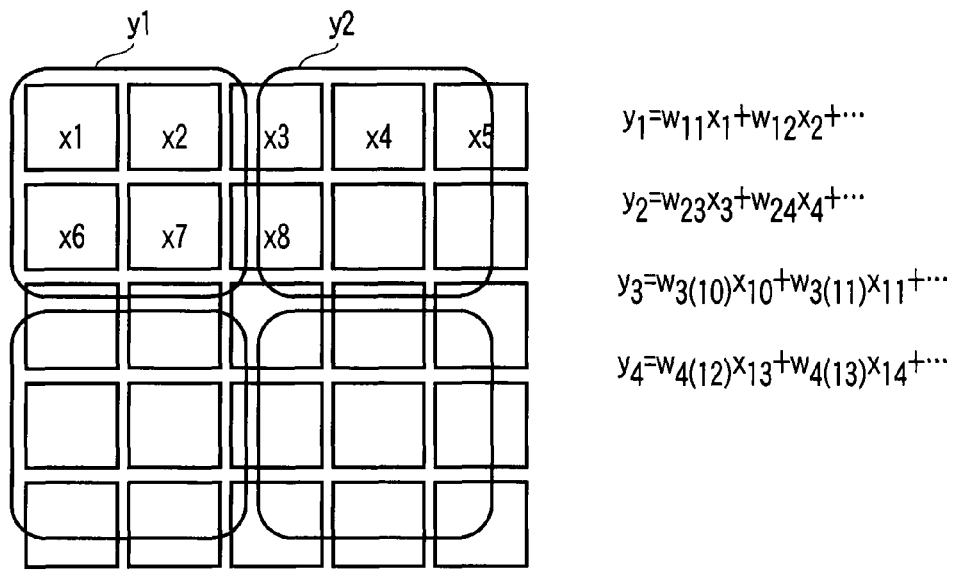
FIG. 16 is an exemplary view of equations associated with output sampling values using sampling values of input pixels.
Figure 17:
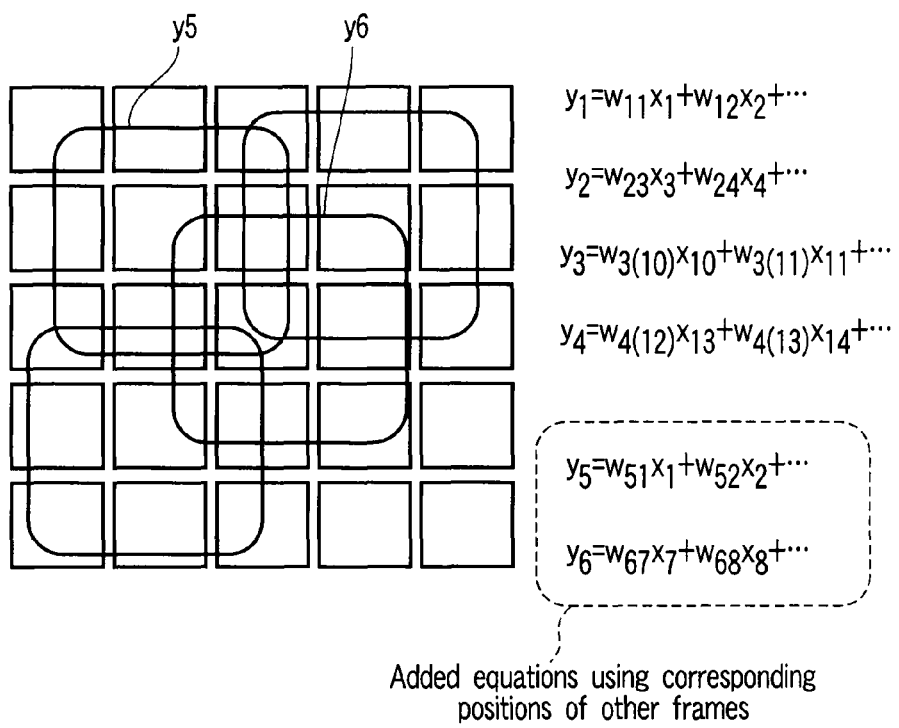
FIG. 17 is an exemplary view of addition equations using sampling values obtained from corresponding positions of another frame.

The method of estimating x when the equation y=Wx is given has been described. When available information is only the sampling values of input pixels in a target image, the number of equations y=Wx is small, as shown in FIG. 16. However, when the number of equations y=Wx is increased, as shown in FIG. 17, using information of images other than the target image (for example, those obtained from other frames of a movie), a more precise output image can be obtained. As a method of increasing the number of equations y=Wx, the same idea as that for a one-dimensional signal can be used. In addition, for example, as in a case of resolution conversion of each frame of a movie, the number of equations y=Wx can be increased based on an idea which is not available for a one-dimensional signal. A practical example will be described below.

(Super-Resolution Using Intra-Frame Data)

Figure 18:
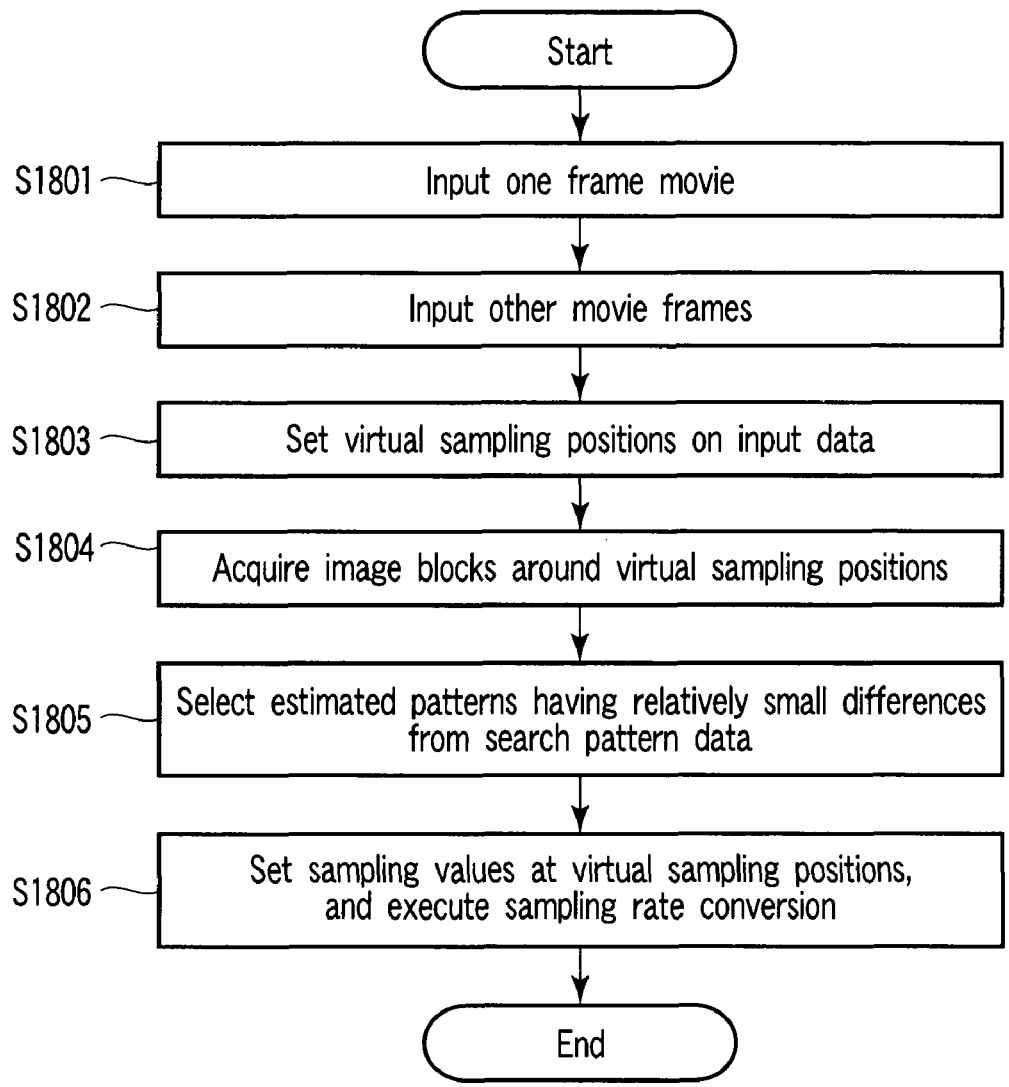
FIG. 18 is an exemplary flowchart showing the operation in the second embodiment of the signal processing apparatus shown in FIG. 7.

When only one image is input, and is to undergo resolution conversion, the number of equations y=Wx can be increased based on the same idea as that for a one-dimensional signal. More specifically, the resolution conversion is executed in the sequence shown in FIG. 18.

(Step 1) A signal accepting unit 704 inputs an image (S1801, S1802). Note that the input image is used as a target of the resolution conversion, and also as search pattern data.

(Step 2) The calculation unit 702 determines positions of pixels at which sampling values are to be acquired (S1803). That is, positions that can reduce the number of possible solutions x if their sampling values are detected are set as virtual sampling positions. For example, the virtual sampling positions can be set at pixel intervals of an output resolution, as shown in FIG. 19 or 20. FIG. 19 shows an example in which virtual sampling positions are set independently of those of an input resolution. FIG. 20 shows an example in which virtual sampling positions are set at positions where no sampling positions of the input resolution are set. Of course, the virtual sampling positions may be set at pixel intervals smaller than the output resolution in consideration of variations of deviations due to correction to be described later, or they may be set at only positions near pixels which are expected to largely influence output image quality, i.e., those which have, e.g., large output values of an edge detection filter. At this time, sampling values at the set positions are unknown.

Figure 21:
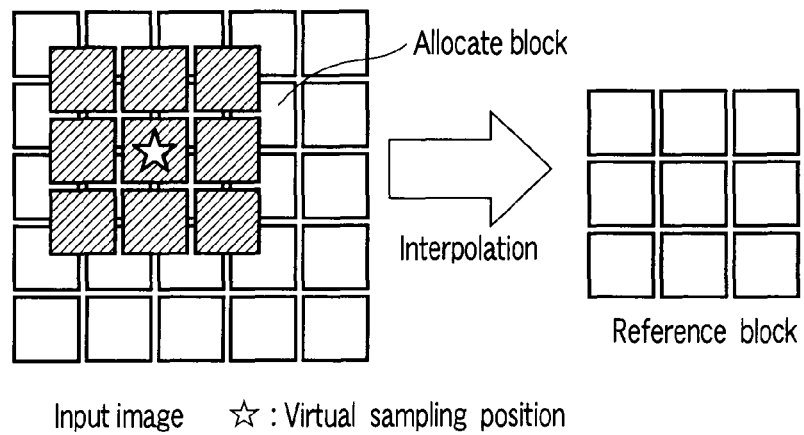
FIG. 21 is an exemplary view showing generation of a reference block from the virtual sampling positions in step S1804 in FIG. 18.

(Step 3) The calculation unit 702 acquires a pattern corresponding to each virtual sampling position. More specifically, a predetermined range (region) in upper, lower, right, and left directions with reference to each virtual sampling position (virtual corresponding point), for example, a block including several pixels in upper, lower, right, and left directions having the virtual sampling position as the center is assumed, and a block corresponding to that region (to be referred to as a reference block hereinafter) is generated as an intensity pattern having the same pixel intervals as the input resolution by interpolation, as shown in FIG. 21 (S1804). In step S1804, for example, the virtual sampling position is located at a position (7.6, 6.3) on a coordinate system of the input resolution, and if a block of 3×3 pixels having that position as the center is to be obtained, intensity values corresponding to nine points (6.6, 5.3), (7.6, 5.3), (8.6, 5.3), (6.6, 6.3), (7.6, 6.3), (8.6, 6.3), (6.6, 7.3), (7.6, 7.3), and (8.6, 7.3) are calculated by interpolation. Note that a term "block" is used for the sake of simplicity. The term 'block' can be an arbitrary shape such as a circle, ellipse, rhombus, and the like in addition to a rectangle.

Figure 22:
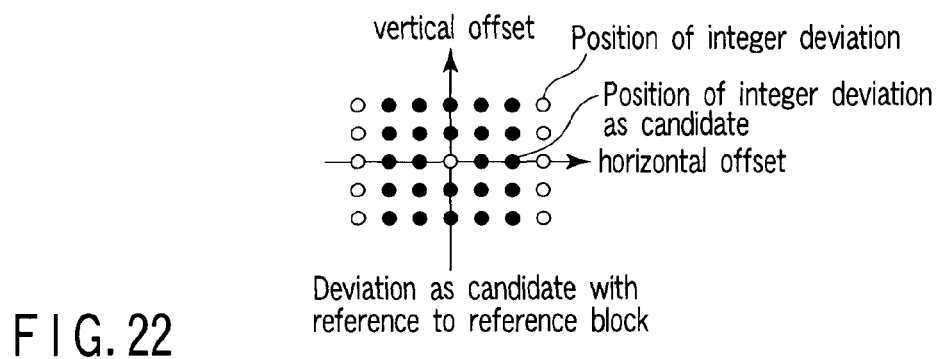
FIG. 22 is an exemplary view showing deviation candidates with reference to a reference block in step S1805 in FIG. 18.
Figure 23:
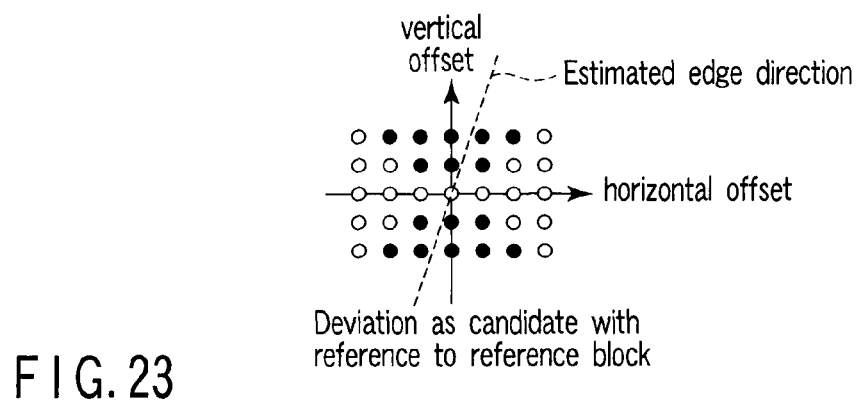
FIG. 23 is an exemplary view showing deviation candidates with reference to a reference block in step S1805 in FIG. 18.
Figure 24:
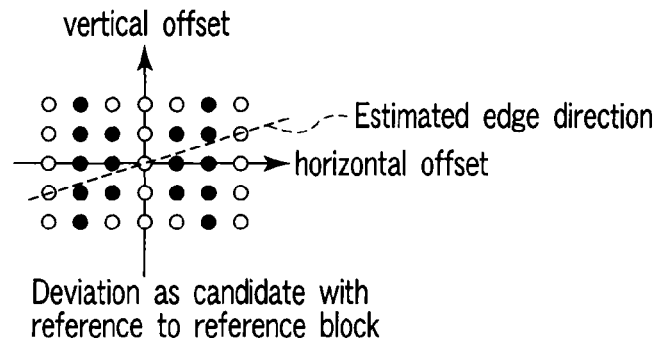
FIG. 24 is an exemplary view showing deviation candidates with reference to a reference block in step S1805 in FIG. 18.

(Step 4) The calculation unit 702 searches the input image for a block (estimated block) which has a small block error from the reference block as much as possible (S1805). As the block error, for example, the sum total of norms of the differences of respective pixel values (e.g., SSD or SAD) and a normalized cross-correlation value may be used. In the search, in order to avoid the reference block itself from being selected, blocks which are located at positions whose L∞ distance (Chebyshev distance) from the virtual sampling position is less than a predetermined threshold (e.g., 0.5 pixel) may be excluded from search candidates. The search range may be the entire frame. However, in order to conduct the search more efficiently, assuming that similar patterns are more likely to appear near the reference block, only a range within several pixels (e.g., 2 to 3 pixels) having the reference block as the center, as shown in FIG. 22, is searched to select a block having a small block error. Alternatively, an adjacent edge direction may be estimated based on the ratio of the output values of, e.g., horizontal and vertical edge detection filters, and search candidates may be limited to those in the edge direction, as shown in FIGS. 23 and 24. As the estimated block, only one block having a smallest block error may be selected or all blocks whose block errors are less than or equal to a threshold may be selected (in this case, if all block errors exceed the threshold, none of blocks are selected). Note that block matching need not always be used in this search, and other motion estimation methods that attain association in pixel units may be used. Also, a method that attains association to the precision smaller than the pixel unit may be used, and its result may be rounded off.

Figure 25:
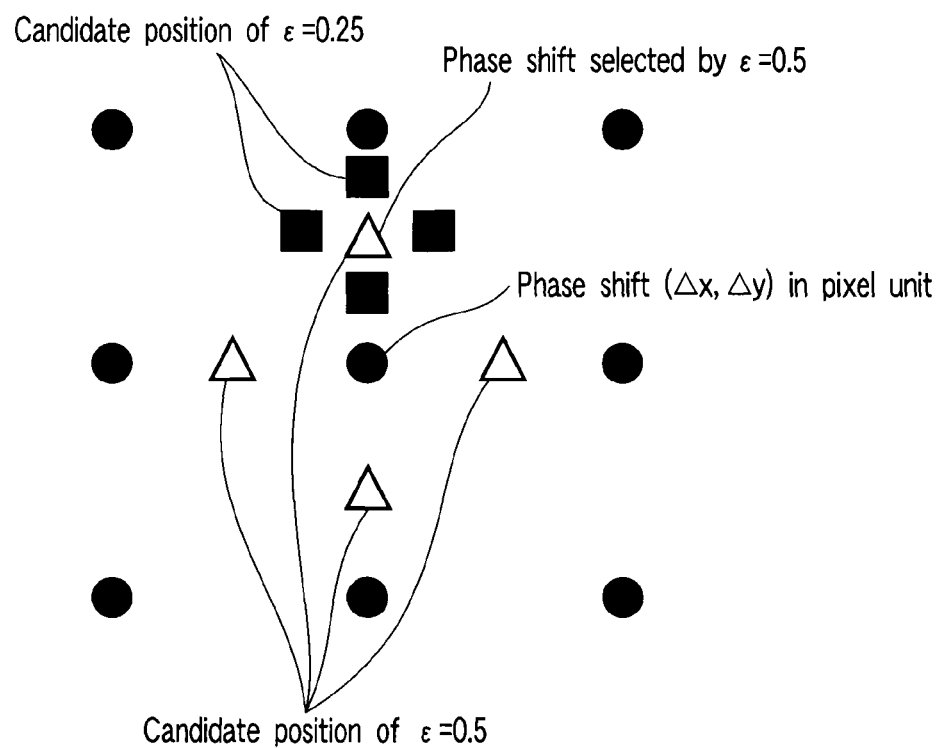
FIG. 25 is an exemplary view for explaining a state in which block errors for five points are evaluated, and a phase shift that can minimize the block errors is selected in step S1805 in FIG. 18.

(Step 5) The calculation unit 702 estimates a phase shift of each set virtual sampling position with reference to the estimated block, and corrects that virtual sampling positions (note that this step may be omitted). The phase shift estimation method can be implemented in the same manner as that for a one-dimensional signal. For example, upon applying a binary search for a one-dimensional signal to a two-dimensional image, the aforementioned binary search may be conducted in the horizontal and vertical directions, respectively. Alternatively, for example, when the current estimated phase shift is represented by ($\Delta x$, $\Delta y$), an operation for evaluating block errors for five points ($\Delta x$, $\Delta y$), ($\Delta x-\epsilon$, $\Delta y$), ($\Delta x+\epsilon$, $\Delta y$), ($\Delta x$, $\Delta y-\epsilon$), and ($\Delta x$, $\Delta y+\epsilon$) or those for nine points ($\Delta x$, $\Delta y$), ($\Delta x-\epsilon$, $\Delta y-\epsilon$), ($\Delta x-\epsilon$, $\Delta y$), ($\Delta x-\epsilon$, $\Delta y+\epsilon$), ($\Delta x$, $\Delta y-\epsilon$), ($\Delta x$, $\Delta y+\epsilon$), ($\Delta x+\epsilon$, $\Delta y-\epsilon$), ($\Delta x+\epsilon$, $\Delta y$), and ($\Delta x+\epsilon$, $\Delta y+\epsilon$), and selecting a phase shift with a smallest block error may be repeated while decreasing $\epsilon$ until desired $\epsilon$ is reached. As $\epsilon$ described in this case, for example, "0.5" is set initially, and a value obtained by multiplying previous ϵ by 0.5 is used as new ϵ in the next operation. For example, when block errors for five points are used, as shown in FIG. 25, the block errors are evaluated for the four candidate positions of ϵ=0.5 and the original position (as the block error of the original position, only the calculated value is used), and a phase shift with the smallest block error is selected. A similar operation is repeated for ϵ=0.25 or less. In evaluation of block errors for subpixel positions, as described above in generation of a reference block, a block having the same resolution as the input image is generated by interpolation, and is used in evaluation. Only when block error evaluation is executed for five points, a phase shift which cannot be estimated exists by the aforementioned method of FIG. 25. When a phase shift is to be precisely estimated even by spending an extra processing time, every phase shift can be estimated using a method of FIG. 32 as a modification of that of FIG. 25. In the method of FIG. 32, estimation is executed in practice in the following sequence. As in the method of FIG. 25, block errors are evaluated for the four candidate positions of ϵ=0.5 and the original position, and a phase shift with the smallest block error is selected. These candidate positions will be referred to as candidate positions of first ϵ=0.5. Only when one of four points other than ($\Delta x$, $\Delta y$) is selected, four candidate positions of second ϵ=0.5 are set, and a phase shift with the smallest one of the block errors is selected. Since two out of the four candidate positions of second ϵ=0.5 overlap the candidate positions of first ϵ=0.5, only non-overlapping two points need only be evaluated in calculations. After this operation, an operation of ϵ=0.25 or less is repeated by the same sequence as that described using FIG. 25 (no second search is needed for ϵ=0.25 or less). For example, when a candidate position ($\Delta x+0.5$, $\Delta y+0.5$) of second ϵ=0.5 is selected, a position whose x- or y-coordinate is separated from ($\Delta x$, $\Delta y$) by 0.5 or more may be selected as a candidate position in the operations of ϵ=0.25 or less. For example, if a position ($\Delta x+0.5$, $\Delta y+0.5$) is selected upon evaluation of second ϵ=0.5, two points ($\Delta x+0.75$, $\Delta y+0.5$) and ($\Delta x+0.5$, $\Delta y+0.75$) of four candidate points of ϵ=0.25 are located at positions separated from ($\Delta x$, $\Delta y$) by 0.5 or more. Ideally, since it is expected that ($\Delta x$, $\Delta y$) is located at a position within 0.5 from a point with the smallest block error, these candidate positions may be omitted (of course, they may not be omitted since ($\Delta x$, $\Delta y$) may be found at a non-ideal position). Using the method of FIG. 32, a phase shift can be precisely estimated while suppressing the number of positions to be estimated at the same time to a total of five points, i.e., the current estimation position and four candidate positions.

In addition to the method of repeating evaluation of block errors while increasing the precision of an estimated phase shift, when an estimation method using an error function of an interpolated signal pattern is used, the aforementioned phase shift estimation method may be applied to the horizontal and vertical directions, respectively. Alternatively, assuming that an error curve is expressed by a two-dimensional quadratic function, it can be assumed that a two-dimensional subpixel position deviation ($\delta x$, $\delta x$) satisfies:

$$a\delta x^2 + b\delta y^2 + c\delta x \delta y + d\delta x + e\delta y + f = SSD$$

For example, as $\delta x$ and $\delta y$, by giving actually measured values of block errors for nine points "−1" to "+1", and calculating a least square solution of coefficients a to f, or giving appropriate six points, and calculating a solution of the coefficients a to f, ($\delta x$, $\delta y$) can be estimated using two equations obtained by a partial differential=0. As described in Shimizu and Okutomi, "Two-dimensional Simultaneous Sub-pixel Estimation for Area-based Matching" (IEICE transactions D-II, Vol. J87-D-II, No. 2, pp. 554-564, 2004), a method of simultaneously estimating a two-dimensional deviation using an equation for a one-dimensional subpixel position deviation may be used. As for correction of the virtual sampling position, the estimated phase shift amount need only be added to or subtracted from the virtual sampling position.

Also, for example, by executing corner determination using a Harris's corner detection method (C. Harris, M. Stephens, A Combined Corner and Edge Detector, Alvey Vision Conference, pp. 147-151, 1988), the equation for a two-dimensional subpixel position deviation may be used for corner portions, and the equation for a one-dimensional subpixel position deviation may be used for other portions.

(Step 6) The calculation unit 702 sets a sampling values at the center of each estimated block as that at the corresponding virtual sampling position. Or if step 5 is skipped, after phase shifts are estimated, sampling values at the virtual sampling positions may be generated by interpolation according to the estimated phase shifts.

(Step 7) The calculation unit 702 adds equations including Point Spread Functions:

$w_{ij}$ at the virtual sampling positions, and the found sampling values:

$y_i$

Note that steps 3 to 7 are basically repeated for all the virtual sampling positions set in step 2. For example, upon implementation as a single-thread program, steps 3 to 7 are repetitively executed while switching the virtual sampling position. However, for example, when the processing time is limited as in a use method of applying resolution conversion to broadcast video data at the same rate as the frame rate of an input movie, a method, in which a censored time is set in advance, and if the censored time is reached, the process can advance to step 8 if the processing of all the virtual sampling positions is not complete yet, may be adopted. The virtual sampling positions which are not processed are discarded.

(Step 8) The calculation unit 702 applies the RECONSTRUCTION to obtained W and y (S1806).

(Step 9) If the resolution conversion of a movie is executed, the calculation unit 702 switches the input image to the next frame, and repeats the above processes from step 2 until all frames are processed.

(Super-Resolution by Integrating Intra- and Inter-Frame Data)

In the resolution conversion for frames of a movie or that for a plurality of images captured by a multi-camera, data of a plurality of images can be used as search pattern data in addition to an image which is to undergo resolution conversion as in a case of stereo and 5.1-channel data for audio data. By increasing the number of search pattern data, the ambiguity of estimated signals x or signal pattern errors (block errors in images) in equations to be added to y=Wx can be reduced. As a result, noise mixed in estimated signals x can be reduced, and the quality of an image after the resolution conversion can be improved.

A practical example of the resolution conversion sequence will be described below.

(Step 1) An image (input image) to be converted is input (S1801). For example, in the case of the resolution conversion of a movie, the next frame to be converted in the movie is set.

(Step 2) A plurality of images (those used to increase the number of equations y=Wx) which are to undergo a search are input (S1802). For example, in the case of the resolution conversion of a movie, the frame to be converted itself, and K frames before and after the frame to be converted, i.e., a total of (2K+1) frames can be input.

(Step 3) The positions of pixels (virtual sampling positions) where sampling values are to be acquired are determined for the input image (S1803). As this setting method, the same setting method as that upon applying the resolution conversion to one image can be used.

(Step 4) An image block corresponding to each virtual sampling position is acquired (S1804). More specifically, as shown in, e.g., FIG. 21, a predetermined range (region) including pixels in upper, lower, right, and left directions with reference to each virtual sampling position (virtual corresponding point), for example, a block in which several pixels are virtually allocated in upper, lower, right, and left directions at the same intervals as pixels of the input image to have the virtual sampling position as the center is assumed, and a reference block which corresponds to this region and is defined in the above description is generated by interpolation as an intensity pattern having the same pixel interval as the input resolution.

Figure 26:
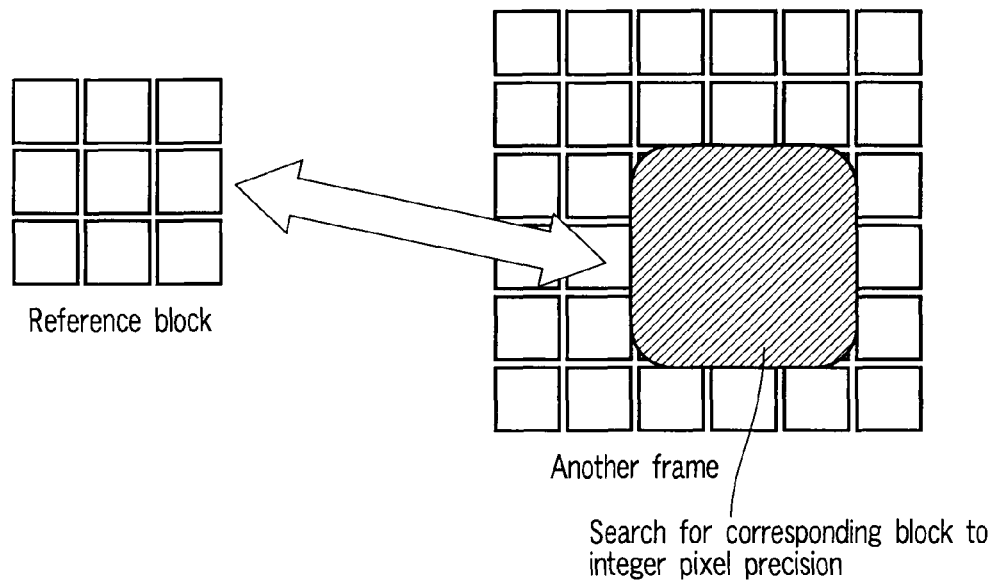
FIG. 26 is an exemplary view showing a state in which a block which can reduce a block error from the reference block is searched for in step S1805 in FIG. 18.
Figure 27:
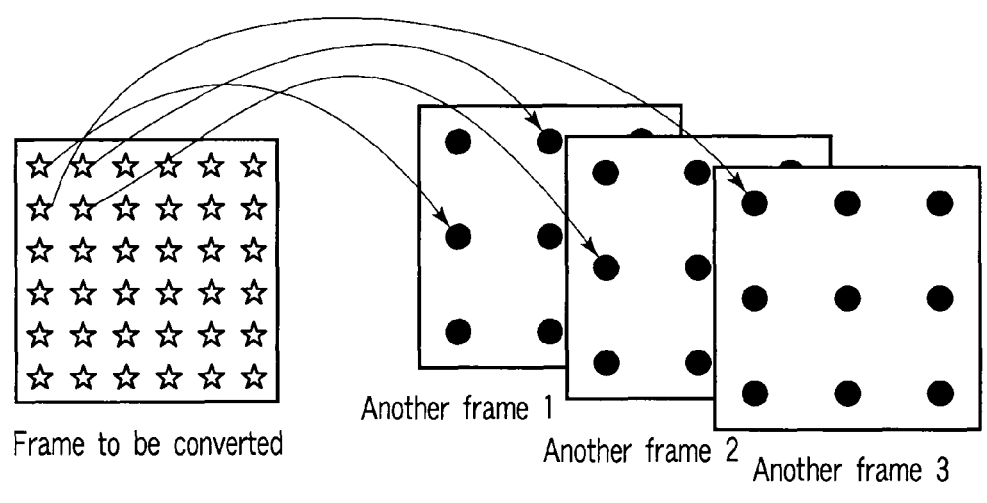
FIG. 27 is an exemplary view showing a state in which virtual sampling positions of a frame to be converted are associated with pixel positions of other frames.

(Step 5) In an image which is to undergo a search, a block (estimated block) having a small block error (e.g., SSD or SAD) from the reference block as much as possible is searched (S1805). As for the frame to be converted itself of those which are to undergo a search, block candidates are set so as not to select the reference block itself as in the aforementioned method for one image. For other image frames, for example, block candidates are set by the following method. For example, for each of preceding and succeeding frames, in turn from an image close to the frame to be converted, block candidates are set at respective integer pixel positions within a predetermined range (a range in which horizontal and vertical differences are 10 pixels or less) to have the position of a block that yields a smallest block error in the immediately preceding frame as the center (to have the position of the reference block for frames immediately before and after the frame to be converted as the center). For each set block candidate, as shown in FIG. 26, a block error (e.g., SSD or SAD) from the reference block is evaluated, as shown in FIG. 26, and a block having a smallest block error (or having a block error less than or equal to a predetermined value) is selected as an evaluated block. By association, the virtual sampling positions on the frame to be converted are generally associated with the pixel positions on different frames (FIG. 27). Note that the search may use various high-speed search algorithms, for example, a Diamond Search (Jo Yew Tham et al., "A Novel Unrestricted Center-Biased Diamond Search Algorithm for Block Motion Estimation," IEEE Transaction on Circuits and Systems for Video Technology, vol. 8, no. 4, August 1998).

Figure 28:
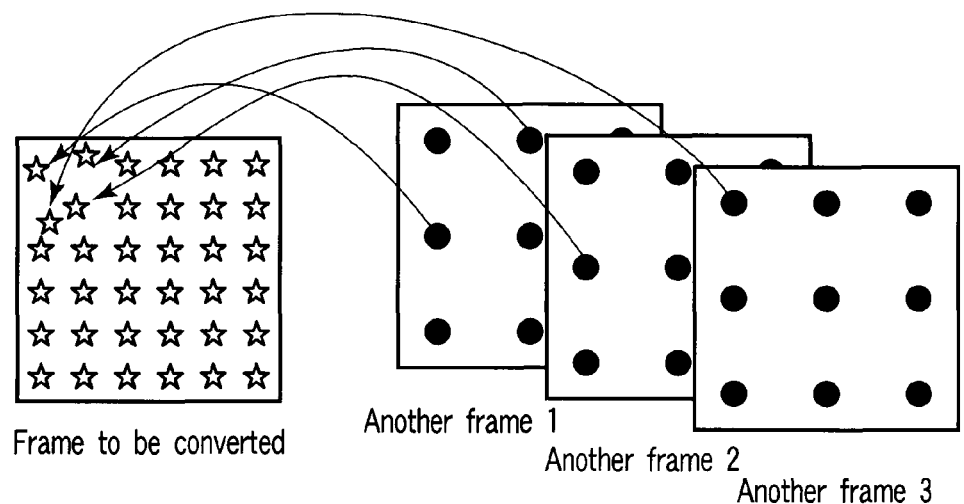
FIG. 28 is an exemplary view showing a state in which virtual sampling positions are corrected based on the estimated phase shift.

(Step 6) Phase shifts of the set virtual sampling positions are estimated with reference to the estimated blocks, and the virtual sampling positions are corrected (note that this step may be omitted). As the phase shift estimation method, the same method as that for one image described above can be used. As a result of this step, the virtual sampling positions associated, as shown in FIG. 27, are slightly shifted from the initially set positions, as shown in FIG. 28.

(Step 7) A sampling value at the center of each estimated block is selected as that at the virtual sampling position. If step 6 is skipped, phase shifts are estimated, and sampling values at the virtual sampling positions may be generated by interpolation according to the estimated phase shifts.

(Step 8) Equations including Point Spread Functions:
$w_{ij}$
at the virtual sampling positions, and the found sampling values:
$y_i$
are added. Steps 4 to 8 may be executed for all the virtual sampling positions or for only some virtual sampling positions, as described above. The virtual sampling positions which are not processed are discarded.

(Step 9) The RECONSTRUCTION is executed using obtained W and y (S1806).

(Step 10) If the resolution conversion of a movie is in progress, the processing is repeated from step 2 by switching the next frame to be converted until all frames are processed.

This method can be applied to the resolution conversion of images having a plurality of channels, e.g., images captured from a plurality of viewpoints.

(Difference Between Method of this Embodiment and Conventional Super-Resolution)

Conventional super-resolution methods explore precise motions from other frames to a frame to be converted. Unlike conventional super-resolution methods, the method of this embodiment executes association by searching for local patterns in other frames that precisely match those with reference to positions where sampling values are to be acquired in the frame to be converted. According to "S. C. Park et al., "Super-resolution Image Reconstruction: A Technical Overview," IEEE Signal Processing Magazine, pp. 21-36, May 2003", the conventional super-resolution uses estimation of complicated motions for, e.g., respective objects to obtain precise motions. However, even when complicated time-consuming image processing is executed to obtain precise motions, the following problems (A) and (B) remain unsolved. (A) Whether or not phase shifts included in the obtained precise motions are suited to resolution conversion is unknown. (B) Since no corresponding positions are found due to a modification or movement of an object itself depending on frames, it is inevitable to add wrong equations to y=Wx due to mixing of noise such as estimation errors of motion vectors. Of these problems, the problem (A) can be solved or greatly lightened by setting the virtual sampling positions by the method of this embodiment. As for the problem (B), using data in a plurality of images as search pattern data in the method of this embodiment is to select only blocks with sufficiently small block errors from the plurality of images, and blocks in frames which include no corresponding positions are excluded by this selection. Alternatively, upon selecting only blocks with smallest block errors as estimated blocks, if at least one of a plurality of frames includes blocks that do not suffer any modification or movement of an object itself, since blocks in other frames that suffer any modification and the like are never selected, wrong equations to y=Wx due to association to such frames are never added. Therefore, at least compared to the conventional method that calculates motions to a frame which is to undergo the resolution conversion from respective frames of a movie, using the method of this embodiment that selects only appropriate blocks from a plurality of other frames based on the virtual sampling positions set on the frame which is to undergo the resolution conversion, it can be expected that the possibility of addition of wrong equations to y=Wx is greatly reduced. That is, according to the embodiment, the problem (B) can be greatly lightened.

Figure 29:
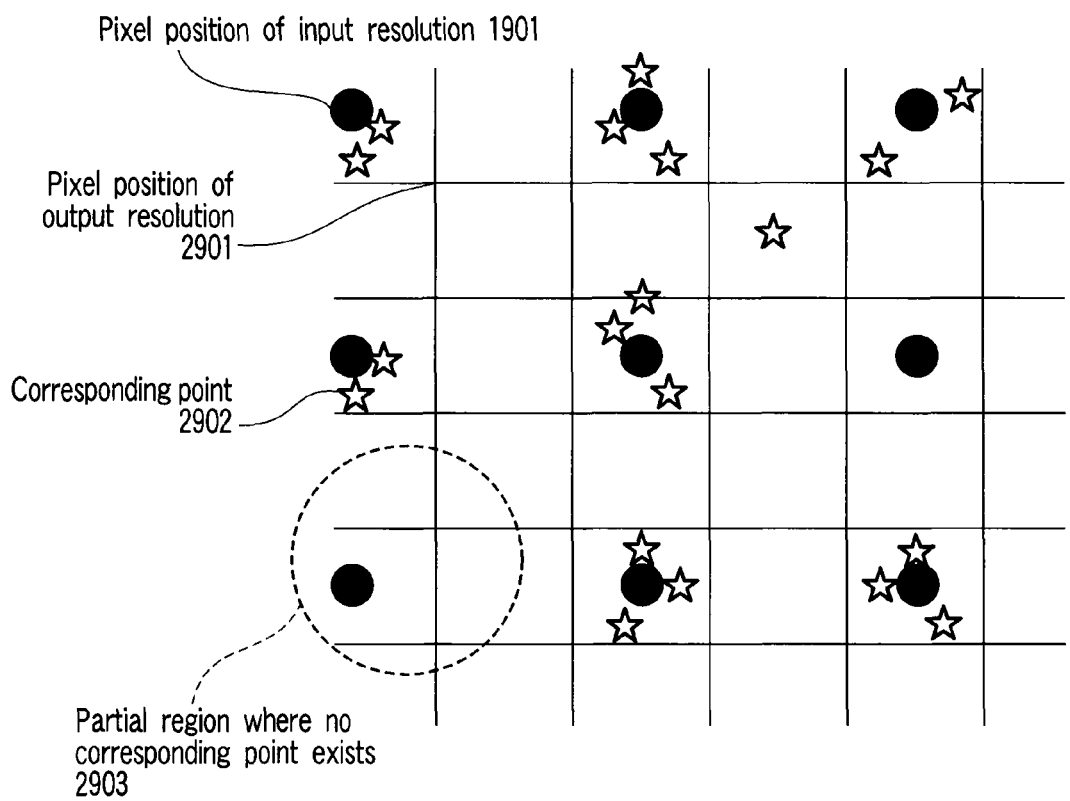
FIG. 29 is an exemplary view showing corresponding points obtained by block matching with reference to integer pixel positions of an input resolution.
Figure 30:
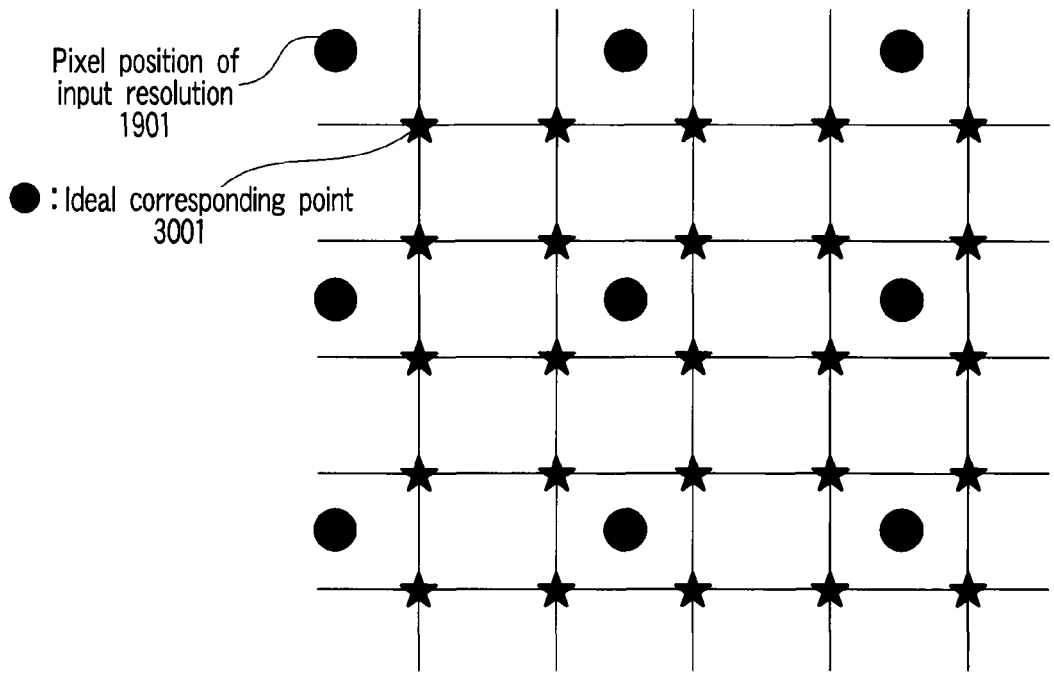
FIG. 30 is an exemplary view showing ideal corresponding points in an image.
Figure 31:
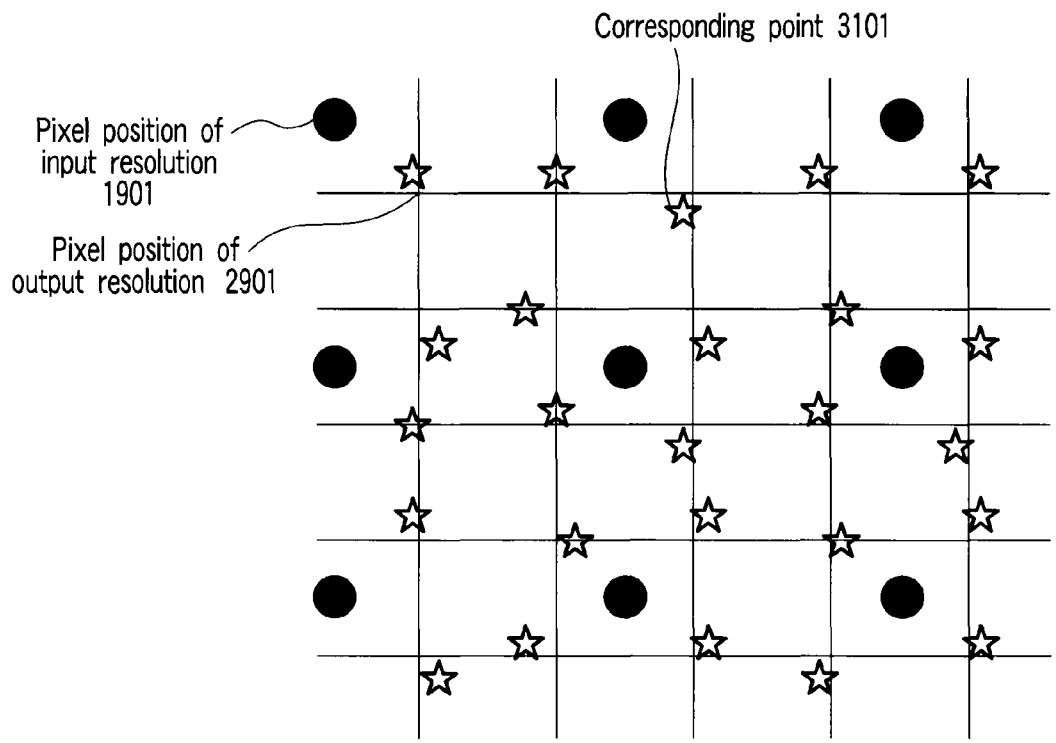
FIG. 31 is an exemplary view showing corresponding points obtained by the signal processing apparatus according to the embodiment.

Note that each of the aforementioned embodiments is one method of deciding corresponding points using block matching and function fitting, but it is largely different from the conventional method of obtaining corresponding points without setting any virtual sampling positions for the following reason. Upon conducting a search based on block matching for respective integer pixels, the same phenomenon in which a signal pattern having a phase shift close to zero with respect to a reference signal pattern in one dimension is preferentially selected occurs. Therefore, when block matching is executed with reference to integer pixel positions of the input resolution, obtained corresponding points 2902 are concentrated in the vicinity of integer pixel positions 1901 of the input resolution. The Point Spread Functions for these positions have coefficient similar to those for the integer pixel positions 1901 of an input image, the ambiguity of estimated signals cannot be practically reduced (equations having identical coefficients are merely arranged in fact). Ideal corresponding points in an image are located at positions shown in, e.g., FIG. 30. For example, by setting virtual sampling positions at these positions and executing block matching and correction of the virtual sampling positions by the method of this embodiment, positions 3101 of the obtained corresponding points are as shown in FIG. 31. Equations obtained by setting the Point Spread Functions and sampling values at the corresponding points (FIG. 31) obtained by the method of this embodiment can greatly reduce the ambiguity of an output image and can greatly improve its image quality compared to equations obtained by executing similar operations to the corresponding points 2902 (FIG. 29) simply obtained using block matching.

(Modification of Inter-Frame Correspondence)

Note that the method of this embodiment can use motion estimation between two frames. For example, a case will be examined wherein four circuits which execute high-speed inter-frame motion estimation are available for input blocks. In this case, the inter-frame motion estimation can be used as follows. As inputs, an image which is to undergo the resolution conversion (frame to be converted) and four other frames are accepted. Virtual sampling positions are set on the frame to be converted. Next, for each virtual sampling position, a block having that position as the center is generated by interpolation, and corresponding positions are found from other frames using the motion estimation circuits. Finally, either the following processing (1) or (2) is executed. (1) For all the obtained positions, the virtual sampling positions are corrected, and equations y=Wx are generated, thus executing the RECONSTRUCTION. (2) For each block generated by interpolation, returned block errors of four blocks are evaluated, and a block with a smallest block error is selected. Next, for respective positions obtained from each selected block, the virtual sampling positions are corrected, and equations y=Wx are generated, thus executing the RECONSTRUCTION.

(Speeding Up of Two-dimensional Corresponding Point Estimation)

In the above description, interpolation is made in the step (S1804) of acquiring the virtual sampling positions. Since this interpolation is repeated as much as the number of virtual sampling positions, a considerably long processing time is required depending on the data amount. Especially, such problem is conspicuous when the interpolation method that requires a large calculation volume is used. A block to be extracted by each interpolation is a block having a slightly shifted position as the center. Therefore, upon expressing the interval of the virtual sampling positions by the input resolution, if the pixel interval is expressed using a fraction of integer values and the denominator assumes a small value, interpolated images for the entire frame are generated as much as necessary, and blocks are extracted from the interpolated images, thus reducing the calculation amount required for interpolation. A practical sequence will be described below. Note that the interval of the virtual sampling positions is specifically values like a ½ pixel interval, ⅓ pixel interval, and ⅔ pixel interval.

(Step 1) Images are input as in the aforementioned embodiments (S1801, S1802).

(Step 2) Positions of pixels, the sampling values of which are to be acquired, are set as virtual sampling positions on the input data (S1803). At this time, the horizontal and vertical intervals of the virtual sampling positions are set to be equal intervals. In the following description, the horizontal and vertical intervals of the virtual sampling positions upon expressing the intervals by the input resolution are respectively described by:

$h_1^{(x)}/h_2^{(x)},$ $h_1^{(y)}/h_2^{(y)}$

Superscripts (x) and (y) represent directions (horizontal and vertical in turn), and if the directions need not be specified, the interval is simply described by:

$h_1, h_2$

Assume that these values:

$h_1, h_2$ are integers, which satisfy:

$h_1 > 0, h_2 > 0$ (Step 3) In each direction, in consideration of all shift values:

$\{0/h_2, 1/h_2, 2/h_2, \ldots, (h_2-1)/h_2\}$ as pairs of shift values in the horizontal and vertical directions, there are $h_2^{(x)} h_2^{(y)}$ pairs of shift values as well as a case without any shift. For all these pairs of shift values, images obtained by shifting the image which is to undergo the resolution conversion by the pairs of shift values are generated by interpolation.

(Step 4) Patterns with reference to the virtual sampling positions are acquired from the images shifted by the pairs of shift values corresponding to the virtual sampling positions (S1804). Although each of the aforementioned embodiments needs interpolation in this step, since all the interpolated patterns are generated in step 3, this embodiment does not require any interpolation for each virtual sampling position, and can use the generated patterns.

(Step 5) As in the embodiments described so far, step S1805 and subsequent steps are executed using intra-frame data or other frames. Note that the example of two dimensions has been described. However, the method of avoiding sequential interpolation by generating interpolated patterns in advance can be similarly applied to other dimensions, e.g., to one dimension.

(Use of Database)

As in one-dimensional signals, images of two-dimensional signals include many local patterns having reproducibility. Therefore, blocks are extracted in advance from many images, are saved in a database, and are added as search candidates, thus increasing the chances of improvement of equations to be added to y=Wx. Note that the image capturing process of each saved image normally does not match that of an input image. For this reason, a function different from that of an input image may be used as the Point Spread Function. Upon extracting a large number of blocks from many images, since the disk capacity required for the database and the time required for a search increase very much, the data amount may be reduced by clustering. As clustering, for example, a K-Means method can be used.

(Conversion Including Missing Data: Interlaced to Progressive)

When an input image is an interlaced movie, one method of applying the resolution conversion to each frame of the interlaced movie is to consider each of two fields that form each frame as one image, to apply the method of this embodiment to each field image, and to generate an interlaced movie frame from the two field images. Alternatively, another method is to generate two progressive images for two fields by interpolation in the vertical direction, to apply the method of this embodiment to obtain progressive image frames of the output resolution, and to decimate an output image in the vertical direction to generate an interlaced movie frame.

(Conversion Including Missing Data: Super-Resolution for Interlaced Image)

In order to obtain an image with higher quality in the resolution conversion of an interlaced movie, the method of this embodiment may be applied to an interlaced movie by the following method. In the method to be described below, since a progressive image frame can be obtained for each field of an interlaced movie as an output image, an interlaced movie frame can be generated by decimating the output image in the vertical direction after processing.

(Step 1) An input image field to be converted is input. Alternatively, the next image field to be converted is set. In the case of data in which images of two fields are mixed, top and bottom fields are separated, and images are input according to the time series of original data. Alternatively, if the time series of two fields is unknown, either of these fields is processed first.

(Step 2) A plurality of images which are to undergo a search (those used to increase the number of equations y=Wx) are input. For example, the field to be converted itself, and K fields before and after the field to be converted, i.e., a total of (2K+1) fields can be input.

(Step 3) On an image space of an input frame that assumes an input field and its missing field, positions of pixels where sampling values are to be acquired (virtual sampling positions) are determined. As this setting method, the same setting method as that upon applying the resolution conversion to one image can be used. The virtual sampling positions are allocated on a missing part too.

(Step 4) Image blocks corresponding to the virtual sampling positions are acquired. More specifically, a predetermined range (region) including pixels in upper, lower, right, and left directions with reference to each virtual sampling position (virtual corresponding point), for example, a block which includes several pixels in upper, lower, right, and left directions to have the virtual sampling position as the center is assumed, and a reference block which corresponds to this region and is defined in the above description is generated by interpolation as an intensity pattern having the same pixel interval as the input resolution (S1804). Since intensity values are unknown for a missing field, an image coordinate system having a ½ resolution in the vertical direction is virtually assumed, and interpolation is made with reference to virtual sampling positions on the coordinate system having the ½ resolution in the vertical direction.

(Step 5) For all image fields which are to undergo a search, blocks (estimated blocks) which have small block errors (e.g., SSD or SAD) from the reference block as much as possible are searched for (S1805). This search can be conducted by the same method as the aforementioned method (that for a progressive image in place of an interlaced image), except that the search unit is a field in place of a frame.

(Step 6) Phase shifts of the set virtual sampling positions are estimated with reference to the estimated blocks, and the virtual sampling positions are corrected (note that this step may be omitted). The virtual sampling positions can be corrected by the same method as that described above.

(Step 7) A sampling value at the center of each estimated block is selected as that at the virtual sampling position. If step 6 is skipped, phase shifts are estimated, and sampling values at the virtual sampling positions may be generated by interpolation according to the estimated phase shifts.

(Step 8) Equations including Point Spread Functions:

$w_{ij}$ at the virtual sampling positions, and the found sampling values:

$y_i$ are added. Steps 4 to 8 may be executed for all the virtual sampling positions or for only some virtual sampling positions, as described above. The virtual sampling positions which are not processed are discarded.

(Step 9) The RECONSTRUCTION is executed using obtained W and y (S1806). The image data obtained in this step is not interlaced image data but progressive image data. Then, the obtained image data is decimated in the vertical direction if necessary to generate interlaced image data. As a simple method which is inferior in accuracy of output field image data, a method of defining the Point Spread Functions as the weighted sum of pixels of an output field, and executing the RECONSTRUCTION regardless of information of a field which is not output (i.e., which is decimated later) may be used.

(Step 10) The operation is repeated from step 2 by switching the next field to be converted according to the time series until all fields are processed.

(Modification of Interlaced to Progressive Conversion)

The application method of the method of this embodiment to an interlaced movie has been exemplified. Even in an interlaced movie, for example, a still region can be used intact even for fields having different times and positions. Normally, field data of an interlaced movie are alternately saved like 0→1→0→1→.... Therefore, as for pixels of a field immediately before or after a field which is to undergo the resolution conversion, if it is determined that intensity values between these fields have no difference (e.g., the difference does not exceed a predetermined threshold), the intensity values of the immediately preceding or succeeding field can be used intact (or their average values can be used) for these pixels. In this way, when some intensity values of a missing field are estimated, they can be used in addition of equations of the restraint condition y=Wx, in interpolation upon giving initial values of x in the RECONSTRUCTION, and estimation of intensity values in blocks to be generated by interpolation in step 4. Note that, for example, pixels which cannot be estimated from the preceding or succeeding field may be estimated by interpolation from the field which is to undergo the resolution conversion in the vertical direction. If all data of unknown fields are given by interpolation, a method such as cubic convolution interpolation that needs sampling data at equal intervals in interpolation of initial values of x or blocks can be easily used. In this case, data estimated by interpolation in the vertical direction need not be added to the restraint condition y=Wx.

(Modification of Interpolation Method)

Note that the embodiments described so far use interpolation to give initial values of x. However, interpolation need not always be used to give initial values of x. For example, of each sampling position of an input signal or input image and each virtual sampling position after correction, a position closest to each output pixel position may be searched for, and its intensity value may be used as an initial value.

(Tradeoff Control of Speed and Precision)

When the allocation intervals of virtual corresponding points (virtual sampling positions or virtual sampling times) are changed, the balance between the calculation amount and precision can be controlled. When the allocations of virtual corresponding points at the same intervals as the output sampling rate are used as a reference, if the virtual corresponding points are allocated at a sampling rate equal to or higher than the output sampling rate, the number of obtained equations exceeds the number of variables, thus obtaining x with high reliability although the calculation volume increases. On the other hand, when the virtual corresponding points are allocated at intervals lower than the output sampling rate, the number of obtained equations is smaller than the number of variables, thus lowering the reliability of x although the calculation volume decreases. However, even when the virtual corresponding points are allocated at a sampling rate lower than the output sampling rate, x does not always deteriorate to a level that the user can perceive. Hence, when the processing time equivalent to the playback speed can only be spent and the calculation volume needs to be decreased as in use of the embodiment in, e.g., a television or hard disk recorder, the output sampling rate may be lowered.

(Extension Method to Signals of Three or More Dimensions)

Note that this embodiment has mainly explained the cases of a one-dimensional signal and two-dimensional signal (image). However, the method of this embodiment can also be applied to signals of three or more dimensions. For example, the method of this embodiment can be applied to a three-dimensional voxel signal captured and generated by radiation (X-ray CT) or nuclear magnetism (MRI) and a spatiotemporal image in which images are arranged time-serially. For example, in the case of non-one-dimensional signals like RGB, YUV, or the like, the method of this embodiment may be applied to respective signals. Alternatively, the steps of calculating the corresponding positions (those other than the RECONSTRUCTION) may be executed only once, and the obtained result may be used for all the signals. Also, for example, as block errors, the sum total of square errors or absolute value errors calculated on a space of multidimensional signals (e.g., an RGB space) may be used.

According to the aforementioned second embodiment, in the sampling rate conversion (resolution conversion for an image) based on the RECONSTRUCTION, by adding equations to y=Wx using the method of setting desired virtual sampling times or virtual sampling positions first, and finding sampling times or sampling positions corresponding to these virtual sampling times or positions, the ambiguity of estimated signals x can be reduced compared to the conventional method, and an output signal can be estimated with higher precision than the conventional method.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal processing method comprising:
   inputting to-be-processed data including a set of first N-dimensional coordinate values (N: a natural number) in an N-dimensional space and first sampling values at the first N-dimensional coordinate values;
   inputting search pattern data including a set of second N-dimensional coordinate values in the N-dimensional space and second sampling values at the second N-dimensional coordinate values;
   setting a set of virtual corresponding points designated by third N-dimensional coordinate values in the to-be-processed data;
   acquiring, from the to-be-processed data, a plurality of input patterns each including third sampling values within a first range with reference to a corresponding virtual corresponding point of the virtual corresponding points in the N-dimensional space in correspondence with each of the virtual corresponding points, the third sampling values being included in the first sampling values;
   acquiring, from the search pattern data, a plurality of search patterns each including fourth sampling values within a second range with reference to a corresponding second N-dimensional coordinate value of the second N-dimensional coordinate values in correspondence with each of the second N-dimensional coordinate values;
   detecting, from the search pattern data, an estimated pattern including one search pattern included in the search patterns and having smaller differences with respect to the input patterns than other search patterns included in the search patterns;
   setting a plurality of sampling values at first positions corresponding to the virtual corresponding points in the estimated pattern as set sampling values at the virtual corresponding points; and converting a sampling rate of the to-be-processed data using the set sampling values and the N-dimensional coordinate values of the virtual corresponding points.

2. The method according to claim 1, wherein detecting the estimated pattern detects, from the search pattern data, a similar search pattern having a smallest difference with respect to each input pattern compared to the other search patterns, and the one search pattern having a difference, which is not more than a ratio, with respect to the similar search pattern.

3. The method according to claim 1, wherein detecting the estimated pattern detects, from the search pattern data, the one search pattern having a difference, which is not more than a ratio, with respect to the input patterns.

4. The method according to claim 1, further comprising:
detecting, from the to-be-processed data, an adjusted input pattern including a pattern having a small difference with respect to a corresponding estimated pattern within a predetermined range with reference to the corresponding virtual corresponding point in correspondence with the estimated pattern; and
adjusting the virtual corresponding points to second positions corresponding to the virtual corresponding points in the adjusted input patterns as adjusted virtual corresponding points, and
wherein setting the sampling values sets the sampling values at third positions corresponding to the adjusted virtual corresponding points in the estimated patterns as sampling values at the adjusted virtual corresponding points.

5. The method according to claim 1, wherein N is 2, and the to-be-processed data and the search pattern data are image data.

6. The method according to claim 5, wherein the to-be-processed data is one frame in a moving picture, and the search pattern data includes frames other than the to-be-processed data in the moving picture.

7. The method according to claim 5, wherein the input patterns are obtained by interpolating sampling values at pixel positions in blocks which have a shape and have corresponding virtual corresponding points as centers, and the search patterns are obtained by acquiring sampling values in blocks which have pixels in the search pattern data as centers and have the same shape as the input patterns, and
detecting the estimated pattern selects, from the search patterns, signal patterns as the estimated patterns, each signal patterns having a small sum total of norms of sampling value differences at respective pixel positions in the block.

8. The method according to claim 1, wherein N is 1, and the to-be-processed data and the search pattern data are audio data.

9. The method according to claim 1, wherein the search pattern data includes the to-be-processed data.

10. The method according to claim 1, wherein the search patterns are acquired from a database which records in advance patterns having the same size as the input patterns.

11. The method according to claim 1, further comprising:
detecting an adjusted input pattern including a pattern having a small difference with respect to a corresponding estimated pattern within a predetermined range with reference to the corresponding virtual corresponding point in correspondence with the estimated pattern; and
correcting a plurality of sampling values at the virtual corresponding points according to difference between second positions corresponding to the virtual corresponding points in the adjusted input patterns and the virtual corresponding points to obtain corrected sampling values, and
wherein setting the sampling values sets the corrected sampling values as sampling values at the virtual corresponding points.

12. The method according to claim 1, wherein the input data is one of data item including a plurality of channel data items, and the search pattern data includes channel data other than the input data.

13. The method according to claim 1, wherein setting a set of the virtual corresponding points sets a plurality of virtual corresponding points are allocated at an interval not more than a sampling interval of an output signal.

14. A signal processing apparatus comprising:
a first inputting unit configured to input to-be-processed data including a set of first N-dimensional coordinate values (N: a natural number) in an N-dimensional space and first sampling values at the first N-dimensional coordinate values;
a second inputting unit configured to input search pattern data including a set of second N-dimensional coordinate values in the N-dimensional space and second sampling values at the second N-dimensional coordinate values;
a first setting unit configured to set a set of virtual corresponding points designated by third N-dimensional coordinate values in the to-be-processed data;
a first acquisition unit configured to acquire, from the to-be-processed data, a plurality of input patterns each including third sampling values within a first range with reference to a corresponding virtual corresponding point of the virtual corresponding points in the N-dimensional space in correspondence with each of the virtual corresponding points, the third sampling values being included in the first sampling values;
a second acquisition unit configured to acquire, from the search pattern data, a plurality of search patterns each including fourth sampling values within a second range with reference to the corresponding second N-dimensional coordinate value in correspondence with each of the second N-dimensional coordinate values;
a detection unit configured to detect, from the search pattern data, an estimated pattern including one first search pattern included in the search patterns and having smaller differences with respect to the input patterns than other search patterns included in the search patterns;
a second setting unit configured to set a plurality of sampling values at first positions corresponding to the virtual corresponding points in the estimated pattern as set sampling values at the virtual corresponding points; and
a conversion unit configured to convert a sampling rate of the to-be-processed data using the set sampling values and the N-dimensional coordinate values of the virtual corresponding points.

15. A computer-readable medium including computer executable instructions, wherein the instructions, when executed by a processor, cause the processor to perform a method comprising:
inputting to-be-processed data including a set of first N-dimensional coordinate values (N: a natural number) in an N-dimensional space and first sampling values at the first N-dimensional coordinate values;
inputting search pattern data including a set of second N-dimensional coordinate values in the N-dimensional space and second sampling values at the second N-dimensional coordinate values;

setting a set of virtual corresponding points designated by third N-dimensional coordinate values in the to-be-processed data;

acquiring, from the to-be-processed data, a plurality of input patterns each including third sampling values within a first range with reference to a corresponding virtual corresponding point of the virtual corresponding points in the N-dimensional space in correspondence with each of the virtual corresponding points, the third sampling values being included in the first sampling values;

acquiring, from the search pattern data, a plurality of search patterns each including fourth sampling values within a second range with reference to a corresponding second N-dimensional coordinate value of the second N-dimensional coordinate values in correspondence with each of the second N-dimensional coordinate values;

detecting, from the search pattern data, an estimated pattern including one first search pattern included in the search patterns and having smaller differences with respect to the input patterns than other search patterns included in the search patterns;

setting a plurality of sampling values at first positions corresponding to the virtual corresponding points in the estimated pattern as set sampling values at the virtual corresponding points; and converting a sampling rate of the to-be-processed data using the set sampling values and the N-dimensional coordinate values of the virtual corresponding points.

* * * * *